(12) United States Patent
Anderson et al.

(10) Patent No.: US 10,126,451 B2
(45) Date of Patent: Nov. 13, 2018

(54) METHOD TO ESTIMATE AND REMOVE DIRECT ARRIVALS FROM ARRAYED MARINE SOURCES

(71) Applicants: John E. Anderson, Conroe, TX (US); Michael W. Norris, Cypress, TX (US); Haiyang Wang, The Woodlands, TX (US); Young Ho Cha, Houston, TX (US)

(72) Inventors: John E. Anderson, Conroe, TX (US); Michael W. Norris, Cypress, TX (US); Haiyang Wang, The Woodlands, TX (US); Young Ho Cha, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/427,688

(22) Filed: Feb. 8, 2017

(65) Prior Publication Data

US 2017/0269246 A1  Sep. 21, 2017

Related U.S. Application Data

(60) Provisional application No. 62/309,062, filed on Mar. 16, 2016.

(51) Int. Cl.
  *G01V 1/36* (2006.01)
  *G01V 1/28* (2006.01)
  *G01V 1/38* (2006.01)

(52) U.S. Cl.
  CPC .............. *G01V 1/362* (2013.01); *G01V 1/282* (2013.01); *G01V 1/288* (2013.01); *G01V 1/366* (2013.01);

(Continued)

(58) Field of Classification Search
  CPC ...... G01V 1/362; G01V 1/3808; G01V 1/282; G01V 1/288; G01V 1/38; G01V 1/366;
(Continued)

(56) References Cited

U.S. PATENT DOCUMENTS 3,893,539 A   7/1975   Mott-Smith
4,476,550 A   10/1984  Zilkowski
(Continued)

FOREIGN PATENT DOCUMENTS

EP    2 696 217 A2    2/2014

OTHER PUBLICATIONS

Baumstein A. et al. (2010) "Accurate data reconstruction through simultaneous application of statistical and physics-based constraints to multiple geophysical data sets" *Geophysics*, 75(6), pp. WB165-WB172:

(Continued)

*Primary Examiner* — Daniel L Murphy
(74) *Attorney, Agent, or Firm* — ExxonMobil Upstream Research Company Law Department

(57) ABSTRACT

A method for obtaining zero-offset and near zero offset seismic data from a marine survey, with separation of direct arrival information and reflectivity information, the method including: modeling a direct arrival estimate at a passive near-field hydrophone array by using a notional source separation on active near-field hydrophone data; generating reflection data for the passive near-field hydrophone array by subtraction of the modeled direct wave from data recorded by the passive near-field hydrophone array; generating near zero-offset reflectivity traces by stacking the reflection data for the passive near-field hydrophone array on a string-by-string basis or on a combination of strings basis.

15 Claims, 8 Drawing Sheets

(52) U.S. Cl.
CPC .............. *G01V 1/38* (2013.01); *G01V 1/3808* (2013.01); *G01V 2210/1212* (2013.01); *G01V 2210/1293* (2013.01); *G01V 2210/1423* (2013.01); *G01V 2210/24* (2013.01); *G01V 2210/52* (2013.01); *G01V 2210/56* (2013.01); *G01V 2210/59* (2013.01)

(58) Field of Classification Search
CPC ........... G01V 2210/52; G01V 2210/24; G01V 2210/59; G01V 2210/1212; G01V 2210/1293; G01V 2210/1423; G01V 2210/56
USPC .......................................................... 367/21
See application file for complete search history.

(56) References Cited

U.S. PATENT DOCUMENTS

| | | | |
|---|---|---|---|
| 4,693,336 | A | 9/1987 | Newman |
| 4,827,456 | A | 5/1989 | Brac |
| 4,868,794 | A | 9/1989 | Ziolkowski et al. |
| 7,218,572 | B2 | 5/2007 | Parkes |
| 7,440,357 | B2 | 10/2008 | Hopperstad |
| 7,539,079 | B2 | 5/2009 | Hoogeveen et al. |
| 8,352,190 | B2 | 1/2013 | Baumstein et al. |
| 8,467,264 | B2 | 1/2013 | Keers et al. |
| 8,605,551 | B2 | 12/2013 | Hopperstad |
| 8,687,462 | B2 | 4/2014 | Hopperstad |
| 8,917,573 | B2 | 12/2014 | Yang et al. |
| 8,958,266 | B2 | 2/2015 | Kragh et al. |
| 8,964,502 | B2 | 2/2015 | Norris |
| 2008/0175102 | A1 | 7/2008 | Hegna et al. |
| 2009/0073804 | A1 | 3/2009 | Laws et al. |
| 2012/0072115 | A1 | 3/2012 | Laws |
| 2013/0279291 | A1 | 10/2013 | Keers et al. |
| 2015/0234071 | A1 | 8/2015 | Hegna |

OTHER PUBLICATIONS

Brink, M., et al. (1999) "The value of near field hydrophone measurements for monitoring source signature variations", *EAGE 61st Conference and Technical Exhibition*, Expanded Abstracts, Session 6-09; 4 pages.

Dragoset, B. (2000) "Introduction to air guns and air-gun arrays" *The Leading Edge*, pp. 892-897.

Hopperstad, J. F., et al. (2006) "Source Signature Estimation-Attenuation of the Seafloor Reflection Error in Shallow Water": EAGE Expanded Abstract.

Ni, Y. (2014) "Joint inversion of near-field and far-field hydrophone data for source signature estimation" *SEG, Expanded Abstracts*; pp. 57-61.

Ni. Y. (2015) "Source signature estimation in shallow water surveys" *SEG Expanded abstracts*; pp. 71-75.

Niang, C., (2013) "Monitoring of Air-Gun Source Signature Directivity" *SEG Expanded Abstracts*, SEG Houston Annual Meeting; pp. 41-45.

Parkes, G. E., et al. (1984) "The signature of an airgun array: computation from near-field measurements including interactions—Practical considerations": *Geophysics*, 48, No. 2, 105-111.

Sheriff, R. E., et al. (1995). Exploration Seismology (2nd ed.), Cambridge University Press, p. 86. ISBN 0-521-46826-4.

Ziolkowski, A. et al. (1997) "Marine seismic sources: QC of wavefield computation from near-field pressure measurements", *Geophysical Prospecting*, 45, pp. 611-639.

Ziolkowski, A. (1998) "Measurement of air-gun bubble oscillations" *Geophysics*, 63. pp. 2009-2024.

Kragh, E., R. (2000) "Source Signature Estimation—Attenuation of the sea-bottom reflection error from near-lield measurements" *Fast Break*, Issue 6, vol. 18. pp. 260-264.

METHOD TO ESTIMATE AND REMOVE DIRECT ARRIVALS FROM ARRAYED MARINE SOURCES

CROSS-REFERENCE TO RELATED APPLICATION

This application claims the benefit of U.S. Provisional Patent Application 62/309,062 filed Mar. 16, 2016 entitled METHOD TO ESTIMATE AND REMOVE DIRECT ARRIVALS FROM ARRAYED MARINE SOURCES, the entirety of which is incorporated by reference herein.

FIELD OF THE INVENTION

Exemplary embodiments described herein generally pertain to the field of geophysical prospecting and, more particularly, to marine seismic surveying and processing of the measured data. The embodiments described herein can generate an estimate of a zero-offset trace where direct arrival estimates are dominantly taken from active array near-field hydrophone data and reflectivity estimates are dominantly estimated using passive array near-field hydrophone data after mitigation for the direct arrival energy.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

A common practice in the processing of seismic data is to remove the source and receiver signatures from the seismic data. For marine seismic data acquisition, the removal of the source signature requires accurate estimation of the notional signatures at each source location in an array of sources. Since Zilkowski U.S. Pat. No. 4,476,550, there has been a continuous effort to create a shot-by-shot estimate of the far-field signature of an air gun source array. Brac U.S. Pat. No. 4,827,456 selected from a catalog of notional signatures based on key parameters measured at the time of acquisition. Newman U.S. Pat. No. 4,693,336 fired a point source with a known far-field signature just before the primary source array was fired and then computed a transfer function. Parkes U.S. Pat. No. 7,218,572 applied calibration functions and measured physical parameters to the air gun signature model. Hoogeveen U.S. Pat. No. 7,539,079 used separate seismic transmitters or the air guns to locate the air gun sources via travel times. Hopperstad U.S. Pat. No. 7,440,357 proposed to include sea-surface and seafloor reflections of signals in Zilkowski's U.S. Pat. No. 4,476,550 formulation to compute notional signatures. Yang U.S. Pat. No. 8,917,573 used GPS to measure the source array geometry. Laws US20090073804 compensated for height and shape of the sea surface. Hopperstad U.S. Pat. No. 8,605,551 corrected the source array geometry using the near-field hydrophones in the active source array. Hopperstad U.S. Pat. No. 8,687,462 quantified differences between two identical sources within the active source array. Laws US20130279291 computed the notional source signature utilizing two near-field hydrophones at each source location. Hegna US20150234071 redefined the traditional definition of a notional source and computed a transfer function between two locations and then used the transfer function to predict a third point. For seismic acquisition in shallow water, all of these methodologies' ability to compute an accurate far-field estimate is limited by the presence of the ocean bottom and subsurface reflections and by the shot-to-shot variations in the source array geometry. Consequently, estimating and removing surface and subsurface reflection energy from near-field hydrophone data is a problem that conventional techniques have not solved with respect to estimating a source array's far-field signature.

It is common practice in the seismic industry to utilize two air gun source arrays to acquire the data for a 3D or 4D seismic survey. This mode of operation is referred to as "flip-flop" shooting. In this shooting mode, the two source arrays are side-by-side with a crossline spacing of approximately 25 m between the physical centers of the two source arrays. This acquisition arrangement is shown in FIG. 1, which illustrates a plan view of two successive shots in a marine seismic survey using two air gun arrays in a flip-flop style shooting mode. There are 18 gun stations 101 in each source array, with a near-field hydrophone (NFH) disposed above each gun station. Gun stations 102 are two sources that are close enough together (less than 1 m apart) to be treated as a single gun station. In this FIG. 1, two successive shots are shown with the starboard array firing on shot N and the port array firing on shot N+1 (i.e. the flip and the flop of flip-flop). Seismic acquisition vessels can be configured with more than two air gun arrays, but this is less common.

A common practice, as described in Mott-Smith U.S. Pat. No. 3,893,539, has been to place a hydrophone close to each gun station in an air gun array. This practice is illustrated in FIG. 1 by the small gray circles located at each gun station in the port and starboard source arrays. The hydrophone at each gun station has come to be referred to as a near-field hydrophone, NFH, because these hydrophones are typically placed approximately one meter above the air gun(s) that are located at each gun station. This close proximity to an air gun source causes the hydrophone to be within the near-field of the air gun(s) the hydrophone is located above. The NFH is typically a dynamic pressure sensor used to measure pressure and/or particle motion or to measure analogs of pressure and/or particle motion. The term near-field hydrophone is a simplification in regards to what the sensor is capable of measuring, as each sensor can measure a myriad of signals when any or all of the air guns are fired.

Near-field hydrophones have been primarily used as quality control devices for the individual air guns in an air gun array (Mott-Smith U.S. Pat. No. 3,893,539) and as a quality control for the performance and variability of an air gun array (Parkes 1984, Ziolkowski 1997, Brink 1999, Hegna US20080175102). Ziolkowski in U.S. Pat. No. 4,476,550 describes that "notional" air gun signatures can be determined from near-field hydrophones placed at each air gun station and that the notional signatures can be used to generate the far-field signature of the air gun array. In this context, a notional source signature is the pressure field generated at an air gun station without interaction with any other air gun sources and without any energy reflected from the ocean surface, the ocean bottom or the ocean subsurface. Ziolkowski's method uses nominal geometry for the air gun locations and assumes that the air guns within a source array do not interact. In practice, these assumptions break down because typical air gun towing arrangements allow the spacing between the air gun strings to vary along a seismic line. This variation is most evident in the bubble portion of the near-field hydrophone data and is the basis of one technique used to identify changes in the air gun string geometry and changes in the air guns used in a source array.

Near-field hydrophones used in source arrays differ from the hydrophones located in the streamer cables. Table 1 compares the characteristics of streamer hydrophones and near-field hydrophones. There clearly are differences but both sensors are designed to measure dynamic changes in pressure with a significant level of fidelity over a significant range of amplitudes. The principle difference between these sensors is that the near-field hydrophones are designed to survive at pressures well in excess of one bar where streamer hydrophones are designed to measure reflection signal amplitudes on the order of a few microbar. Since both the streamer and near-field hydrophones have dynamic ranges of 90+dB, their recording ranges overlap for a significant portion of amplitude range exhibited by an air gun shot.

One very important additional difference between streamer hydrophones and near-field hydrophones is the minimum offset that is recorded with the sensors. The near-field hydrophones embedded in the active source array can record data that is substantially zero offset data. In this context, substantial means the data recorded by the sensor is well within the coherency distance associated with near surface reflection events and within a single binning cell used to process the seismic data. The near-field hydrophones in the inactive array acquire near-zero offset data, typically 25 m offset data. The minimum offset the streamer hydrophones can record is on the order of 90 to 100+m because of the configuration used to tow the streamers and the air gun arrays. This source to receiver distance results in data or traces missing from the acquisition for the small offsets between source and nearest receivers in the acquired seismic data records. Near offset data refers to data that would have been recorded by a receiver that is closer to the source than any of the survey receivers on the streamers. In water depths greater than 200 m, the minimum streamer offset of 90 to 100+m poses some processing issues but the problems can be surmounted. In water depths less than 200 m, the minimum streamer offset causes important pre-critical water bottom reflection information to not be recorded on the streamer hydrophones. This missing data can seriously impact the quality and accuracy of the seismic image.

TABLE 1

Comparison of typical near-field hydrophones to streamer hydrophone characteristics

| Characteristic | Near-field Hydrophone | Streamer Hydrophone |
| --- | --- | --- |
| Construction | Designed for large amplitude signals in excess of 5 bar | Designed for small amplitude signals as small as microbars |
| Sensitivity (V/bar) | 7 to 10 | 20 |
| Capacitance (nF) | 8 to 12 | 278 |
| Typical digitizers | 24-bit sigma delta | 24-bit sigma delta |
| Sampling interval (ms) | 0.1 to 0.5 | 2 |
| Dynamic range (dB) | 90 to 95 | 95 to 105 |
| Acceleration canceling | No | Yes |
| Number of hydrophones per data channel | One per gun station | 1 to 8 per group |
| Spatial dimension (m) | Single element | 12.6 |
| Acceleration canceling | No | Yes |
| Minimum offset (m) | A few meters | 100 130 |

Since the air gun source array with the embedded NFH is being towed through the water, the location of the NFH is somewhat spatially displaced with respect to the location where the air guns were fired. Typically, air gun arrays are towed through the water at 5 knots (2.5722 m/s). For nominal water velocities, a water depth of 100 m and a towing speed of 5 knots, the NFH would be displaced 0.34 m from the zero offset location. Although this distance is non-zero, the term zero-offset will be used because seismic data measurements at this very near zero offset distance are significant improvement over the 90 m to 150 m offsets that are available from typical production seismic geometries.

The air gun is the most commonly used source generator for marine seismic acquisition associated with petroleum exploration. In operation, the air gun is pressurized (typical gun pressures range from 2000-2500 psi) which stores compressed air in a high pressure chamber. Typically the volume of the high pressure chamber ranges from 20 cubic inches to 350 cubic inches. After the air chamber is fully pressurized, the air gun is fired and releases the compressed air into the water creating a primary pulse which has a typical duration of 10 to 12 ms. Following the primary pulse, a series of additional bubble pulses are created by the expansion-collapse cycles of the air bubble as it rises to the sea surface (Dragoset, 2000). Depending on the depth at which the air gun is fired, the total air gun signature, which includes the primary impulse and the bubble pulse train, can have a duration of 500 to 1000+ms.

The time duration to the peak amplitude of the first bubble pulse is principally a function of the volume of the high pressure chamber, the operating pressure, the depth of the air gun and the type of air gun. This time duration increases as the volume of the high pressure and the operating pressure are increased and it decreases as the depth of the air gun is increased. Additionally, when multiple air guns are fired simultaneously, the character of the bubble pulse train generated by an individual air gun can be altered by its proximity to the other air guns. The pressure source response is further complicated by the mirror reflection from the ocean's surface of a pressure wave generated by a marine energy source. Mathematically the ocean surface reflection is accommodated by including a so-called source ghost at the same distance above the ocean surface as the true source is below the ocean surface. The pressure wave field ghost response is polarity reversed compared to the true air gun source response and has a magnitude proportional to sea surface reflectivity. The sea surface reflectivity magnitude appears to be a function of frequency with an amplitude range from unity at zero frequency to something with smaller magnitude at higher frequencies. The sea state and the reflection angle alter the magnitude of the mirrored pressure response. High frequencies are scattered by a rough sea surface more than low frequencies effectively lowering the magnitude of their comparative sea surface reflectivity.

The interpretability of seismic data can be improved by improving the ratio of the amplitude of the primary pulse to the amplitude of the initial bubble pulse for a seismic source. This ratio is called the peak-to-bubble ratio. Increasing the peak-to-bubble ratio and the need to have detectable reflection energy from a petroleum reservoir motivates the use of multiple individual air guns in the air gun arrays used for marine seismic acquisition. A single air gun with a specified gun volume typically has a fairly low primary-to-bubble ratio. An air gun array with all guns of the same size would marginally improve the primary-to-bubble ratio. Arranging air guns with different volumes in an array and aligning the primary pulses for the individual air guns in the array causes the primary pulses to constructively sum while simultaneously the bubble pulses from different gun volumes to destructively sum. Various designs of air gun arrays are often introduced to meet other practical purposes as well, e.g., alter the bandwidth coverage. Usually a modern air gun array consists of two to four strings of air guns with about 8 to 10 meters distance between the strings and having 10 to 16 air guns or air gun clusters mounted at 6 to 8 gun stations on each string.

FIG. 2 displays near-field hydrophone traces for two successive air gun shots acquired in a flip-flop fashion, wherein a constant gain was used for all traces. The primary pulse 201 and the bubble pulse train 202 are clearly evident on the near-field hydrophones associated with the source array that is being fired, i.e. the active array. The mirrored reflection from the sea surface 203 is difficult to identify because of its reduced amplitude due to 1/r amplitude losses associated with its travel from the air gun to the surface and from the surface back to the near-field hydrophone. The direct arrival 201 and the mirrored surface reflection 203 are much easier to see in the near-field hydrophones associated with the passive source array, i.e. the inactive array. The direct arrivals include signals which travel directly from their point of origin to the recording receivers without having undergone a reflection or refraction. Additionally, the water bottom reflection 203 can be seen on the near-field hydrophones in the inactive array due to the 1/r traveltime, amplitude reduction of the direct arrivals and the mirrored surface reflection.

Applying a 200-ms AGC gain to the near-field hydrophone traces shown in FIG. 2 and plotting a density display under the plotted traces, FIG. 3, allows the water bottom reflection 301, multiples of the water bottom reflection 302, subsurface reflections 303, and direct arrivals 304 to be easily recognized. These same reflection events are also present on the near-field hydrophones in the active source array, but the events are obscured by the air gun signature (i.e. the initial pressure pulse and the bubble train plus the surface mirroring). These near-field hydrophone traces were acquired in a water depth of approximately 130 m. As the water depth decreases, the events become more overlapped and increasingly difficult to identify.

Clearly the direct arrival portion of the near-field trace could be attenuated with a mute as suggested by Kragh U.S. Pat. No. 8,958,266, but doing so would discard a great deal of the near-surface reflection events with the consequence that some shallow multiple generators will not be identified. An alternate approach is suggested by analyzing the spectral content of an air gun far-field signature as a function of time, i.e. a spectrogram. Such an analysis is shown in FIG. 5, wherein the air gun signature that was analyzed in on the right side of the display and a plot of the percent of the total energy as a function of time is plotted on the left side of the display. From this analysis, after 250 to 300 ms, the air gun energy lies below 40 Hz. Applying a 40 Hz low-cut filter would allow some of the reflection events to be identified, but very near-surface events would still be obscured and a significant portion of the usable seismic bandwidth would have been discarded. Removing frequencies below 40 Hz would be especially detrimental to full wavefield inversion (FWI) processing where the low frequency content is so important.

The problem of obscuring reflection events is significantly reduced for the streamer hydrophones because their minimum offset from the source arrays is large and the added distance attenuates the amplitude of the ocean bottom and subsurface reflections. FIG. 4 is a typical common shot gather of streamer hydrophone traces that are nearest to the source array. The water depth of approximately 130 m separates the direct arrivals 401 from the ocean bottom reflection 402 and the subsurface reflections 403. Unfortunately as the water depth decreases, these events will start to overlap.

FIG. 6 illustrates a common shot, trace display of the near-field hydrophones for string 2 gun station 2 and string 5 gun station 2. These two stations are in the same relative position in source array 1 and source array 2. The trace amplitudes are in units of bar. As can be seen in FIG. 6, the air gun signature 603 duration is on the order of 500 to 1000 ms long. Even when the initial air gun signature can be visually identified, the energy associated with the ocean bottom 601 and subsurface reflection events 602 overlap and interfere. The degree of overlap and interference increases as the water depth decreases.

Converting the trace amplitudes shown FIG. 6 to dB values allows the amplitude disparities to be more easily quantified. In FIG. 7, the direct arrivals 701 for the near-field hydrophones in the active array are ~18 dB larger than the direct arrivals observed at the near-field hydrophones in the inactive array. The water bottom reflection 702 is ~33 dB smaller than the direct arrival at the active array and ~15 dB smaller than the direct arrival at the inactive array. The subsurface reflections 703 are more than 24 dB smaller than the direct arrival at the inactive array and more than 42 dB smaller than the direct arrival at the active array. Earlier it was noted that the signature of an air gun is 500 to 1000+ms in duration. This observation is verified in FIG. 7 where the amplitude of the active array trace does not drop below 40 dB until sometime after 1000 ms.

Norris U.S. Pat. No. 8,964,502 provides a methodology to overcome these large amplitude differences, but it requires the calculation of a statistical estimation of the direct arrivals and assumes that the shot-to-shot variations in the air gun arrays are not significant. Depending on the sea state and the condition of the air gun arrays, this is not always a valid assumption. Additionally as noted in U.S. Pat. No. 8,964,502, the statistical estimation must be recomputed when air guns are added to or dropped from the air gun arrays. This method does not mute the direct arrivals so near-surface reflectors are preserved and it does not use frequency domain filters so the near-field hydrophone data and the streamer hydrophone data share a common frequency bandwidth. As noted in U.S. Pat. No. 8,964,502, once the direct arrival energy is removed, the near-field hydrophone traces for a shot can be summed or manipulated to improve the signal-to-noise ratio of the zero offset and near-zero offset near-field hydrophone traces. Removing the direct arrivals from the near-field hydrophone traces, provides an array of subsurface, single sensor data traces with varying offsets which are clustered around the zero offset location of the active source array and around the near-zero offset point located at the center of the inactive source array. It would be valuable to retain these positive characteristics provided by U.S. Pat. No. 8,964,502 while computing the direct arrival estimates on a shot-by-shot basis. Doing so could incorporate shot-to-shot variations in the estimation of the direct arrivals and would automatically accommodate shot-to-shot loss or addition of air guns.

Ideally, the streamer hydrophones would be deployed so the first streamer hydrophone had a zero offset with respect to the center of the source array. Such a deployment is not possible, nor practical, even in deep water because of the towing arrangement that is currently used and the sensitivity and fragility of the streamer hydrophones. Shallow water only exacerbates these issues.

SUMMARY

A method for obtaining zero-offset and near zero offset seismic data from a marine survey, with separation of direct arrival information and reflectivity information, the method including: modeling a direct arrival estimate at a passive near-field hydrophone array by using a notional source separation on active near-field hydrophone data; generating reflection data for the passive near-field hydrophone array by subtraction of the modeled direct wave from data recorded by the passive near-field hydrophone array; generating near zero-offset reflectivity traces by stacking the reflection data for the passive near-field hydrophone array on a string-by-string basis or on a combination of strings basis; generating reflectivity information at the active near-field hydrophone array by subtracting the direct arrival estimate modeled using the notional source separation from the active near-field hydrophone data; and generating an estimate of zero-offset reflectivity traces by calculating a cross-correlation between the reflectivity information at the active near-field hydrophone array and the near zero-offset traces and performing an optimized stacking with summation weights based on coefficients of the cross-correlation.

The method can further include: generating a reflectivity estimate at the active near field hydrophone locations by applying normal moveout timing corrections to the nearly zero-offset reflectivity traces and stacking; generating active array near field hydrophone data without reflectivity information by adaptively subtracting the reflectivity estimate at the active array hydrophone locations; generating a notional source update using as input the active array hydrophone data without reflectivity information; generating a reflectivity information update at the active array hydrophone data locations by subtracting a direct arrival estimate modeled using the notional source update; and generating an updated estimate of zero-offset reflectivity traces by calculating a cross-correlation between the reflectivity information update at the active array hydrophone data locations and the nearly zero-offset traces and performing an optimized stacking with summation weights based on coefficients of the cross-correlation.

In the method, the generating the reflection data for the passive near-field hydrophone array can include muting an early residual of the direct wave prior to the water bottom reflection.

The method can further include generating far-field estimates for the active and passive hydrophone arrays from notional source signatures generated from the notional source separation.

The method can further include: updating estimates for near-field hydrophone geometry variations between the active and passive near-field hydrophone arrays by analyzing a relative distance between the active and passive near-field hydrophone arrays compared to timing differences measured on the direct arrivals in the data recorded by the passive near-field hydrophone array.

The method can further include using updated string geometry as a data quality indicator for a sail line.

The method can further include using variability of the far-field signatures and the variability of the updated string geometry to rank the data quality for sail lines in a seismic survey.

The method can further include conducting the seismic survey, wherein additional near-field sensors are added to a source array in addition to near-field hydrophones disposed at each source station.

The method can further include deriving notional signatures in the notional source separation by computing an initial source separation in a frequency domain and using frequency-domain-derived notional sources as initial guesses for a time-domain approach with non-zero bubble velocity and non-zero vessel velocity.

In the method, a source array used in the marine survey can include at least two different marine sources.

The method can further include: obtaining an estimation of seafloor reflectivity and seafloor depth by computing the notional source separation and then modeling seafloor reflected waves with a trial seafloor reflectivity and a trail seafloor depth; and minimizing a misfit between arrival time and amplitude by comparing modeled and real data.

The method can further include: reconstructing missing near-offset streamer data with an interpolation method and the estimate of zero-offset traces and the nearly zero-offset traces.

In the method, the reconstructed missing near-offset streamer data can be used for trace data estimation at small trace times and streamer data extrapolated to smaller offsets are used at longer trace times.

In the method, the reconstructed missing near-offset streamer data generated through the interpolation method and the streamer data that was extrapolated can be used to initialize an iterative estimation of primaries by sparse inversion (EPSI) algorithm or a closed-loop surface-related multiple estimation (CLSRME) method that estimates an update to the reconstructed missing near-offset streamer data and an update to predicted multiples.

The method can further include removing direct arrival energy from streamer data using one or more of the modeled direct wave on the passive near-field hydrophone array or the modeled direct wave on the active near-field hydrophone array.

A non-transitory computer readable storage medium, encoded with instructions, which when executed by a computer causes the computer to implement a method for obtaining zero-offset and near zero offset seismic data from a marine survey, with separation of direct arrival information and reflectivity information, the method including: modeling a direct arrival estimate at a passive near-field hydrophone array by using a notional source separation on active near-field hydrophone data; generating reflection data for the passive near-field hydrophone array by subtraction of the modeled direct wave from data recorded by the passive near-field hydrophone array; generating near zero-offset reflectivity traces by stacking the reflection data for the passive near-field hydrophone array on a string-by-string basis or on a combination of strings basis; generating reflectivity information at the active near-field hydrophone array by subtracting the direct arrival estimate modeled using the notional source separation from the active near-field hydrophone data; and generating an estimate of zero-offset reflectivity traces by calculating a cross-correlation between the reflectivity information at the active near-field hydrophone array and the near zero-offset traces and performing an optimized stacking with summation weights based on coefficients of the cross-correlation.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Figure 1:
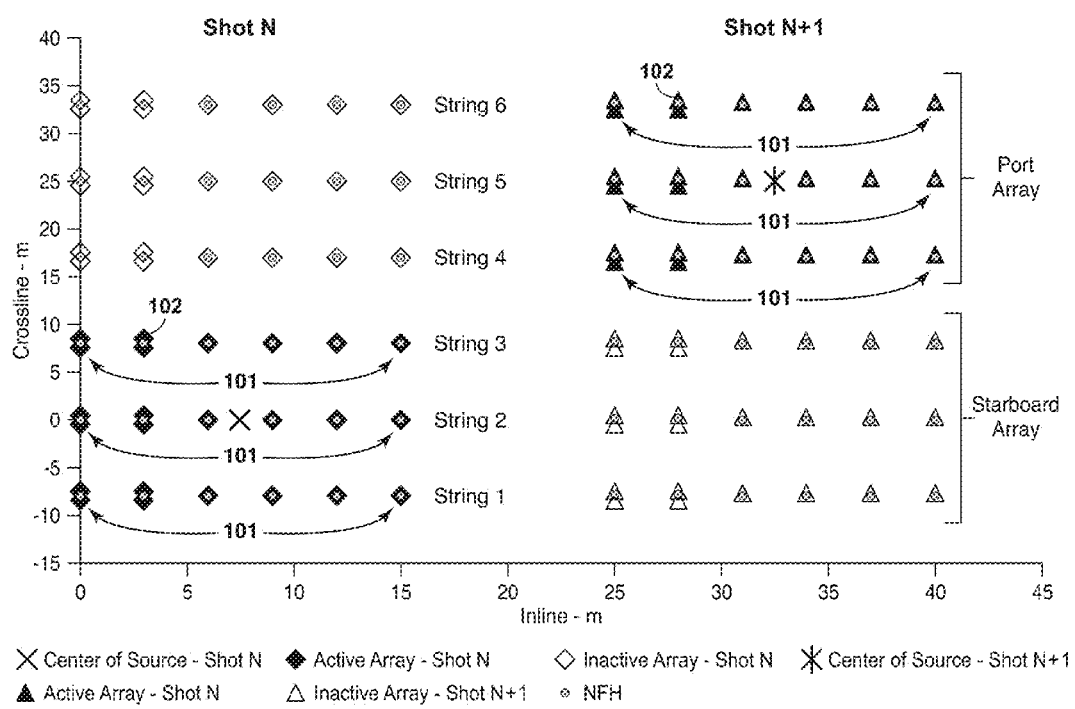
FIG. 1 is an exemplary plan view of two successive shots in a marine seismic survey.
Figure 2:
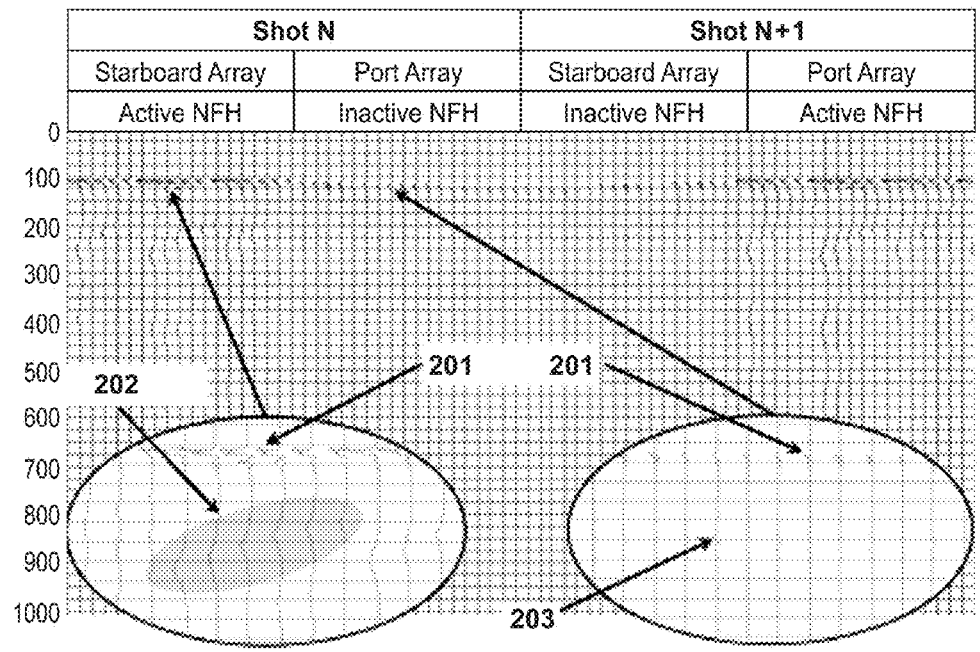
FIG. 2 is an exemplary trace display of the near-field hydrophone data associated with two successive shots using a flip-flop mode.

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement provides a method to remove direct arrivals from the near-field hydrophone data while preserving both the near-surface events and the full spectral content. Once the direct arrival is removed, the near-field hydrophone data is equivalent to having zero offset and near-zero offset streamer hydrophone data except for the array associated with the streamer hydrophone data and the differences in the impulse responses of the acquisition hardware used to record the streamer hydrophone data and the near-field hydrophone data. Typically streamer data channels are a group of hydrophones spaced along the streamer that are analog summed together to produce a single hydrophone signal. Also the NFH and streamer data are recorded as different sampling intervals on different acquisition systems. The differences in the spatial response and the acquisition systems are known and can be accommodated for over a frequency band that is significant to seismic data processing. Some of the differences between NFHs and streamer hydrophones are noted in Table 1. The present technological advancement is also extendable to marine source arrays other than air gun arrays or to marine source arrays with combinations of source types.

The estimation of notional source signatures for marine sources within a source array can be improved by utilizing the source array's actual geometry at the time the source array is fired and by incorporating information from one or more of: 1) the near-field hydrophones embedded in the active source array, 2) the near-field hydrophones embedded in the inactive source array and 3) additional near-field hydrophones that are not located directly above an air gun station. Additional improvements can be gained by including estimates of the ocean surface reflectivity and measured air gun firing errors. A method to achieve improvements in removing the direct arrival energy from near-field hydrophone traces can include: step 1, from the active near-field hydrophone data, run an expanded notional source separation and model the direct wave on the passive near-field hydrophone array; step 2, adaptively subtract the modeled direct wave from the data on passive near-field hydrophone array and mute the early residual of the direct wave (the output from this step is ideally reflection data on the passive near-field hydrophone array). (A "residual" is the difference between the recorded data and the predicted data. When the notional source iterations have progressed to a point where the predicted direct arrival data are very accurate, the residual of the direct arrival will be close to zero. For early iterations, errors will still be there. The portion of the direct arrival residual above the water bottom reflection event can be interpreted and muted. In shallow water, the direct arrivals include energy that overlaps with the water bottom reflection events. That portion of the direct arrival cannot be muted. It would be unexpected if the initial estimate of the direct arrivals was exactly correct. There will be some differences. This mute eliminates the portion of direct arrivals that remains so estimates of the reflection data can be made. After sufficient iterations the estimate of the direct arrivals should be sufficiently good to eliminate the need to mute the residuals.); step 3, stack the reflection data on the passive near-field hydrophone array on a string-by-string basis or on a combination of strings basis, and obtain nearly zero-offset traces; step 4, apply NMO (normal moveout (NMO) describes the temporal change associated with a reflection event associated with a change in the distance between a source and receiver. A standard reference for NMO well-known to all practitioners of seismic data processing is Sheriff. The near-field hydrophones have a spatial extent. To correctly sum them to a zero-offset trace you can first apply a normal moveout correction to correct for the time delay introduced by travel through the earth.) to nearly zero-offset traces and adaptively subtract (or simply subtract) the traces from the real data on the active near-field hydrophone array (the output from this step is ideally the direct wave on the active near-field hydrophone array), (potentially return to step 1 and iterate the process); step 5, model the direct wave on the active near-field hydrophone array and subtract from real data (the output from this step is ideally the zero-offset reflection data), (however, the processing residuals on the active near-field hydrophones may be large enough to overshadow deeper reflection data); and step 6, calculate the cross-correlation between the outputs from step 5 and step 3, and then perform optimized stacking based on the cross-correlation coefficient, outputting the zero-offset trace. Pseudo code for the iterative process is provided in Appendix A.

This workflow can provide: 1) an estimate of the notional signatures for the active source array on a shot by shot basis, 2) a substantially zero-offset trace, 3) a near-zero-offset trace at the crossline offset between the source arrays, and 4) shot-by-shot estimates of the real time source array geometry. The initial arrival on the zero-offset and near-zero-offset traces can be used to estimate the water depth at each source location. The notional signatures and the updated source geometry allow shot-by-shot estimates of the far-field signature and the direct arrival at the streamer sensor sets to be computed. Since the notional signatures, the zero-offset trace and the near-zero-offset trace are computed on a shot-by-shot basis, shot-to-shot variations in the source array signatures can automatically compensate for changes in the air gun configuration and the air gun array geometry.

By substituting different starting source models, the method is applicable to other types of marine sources other than marine air gun sources.

Method for Notional Source Inversion

Near-field hydrophones record the signals from all the active air guns. Based on this idea, Ziolkowski et al. (1982) and Parkes et al. (1984) proposed that the superposition of the direct and reflected waves from N air gun sources can be combined to create the predicted pressure field at any near-field hydrophone.

For fixed source and receiver locations, the pressure response $p_i(\omega)$ at the $i^{th}$ near-field hydrophone would be the sum of the responses due to N air guns, each with notional source $g_j(\omega)$ at location $(x_j,y_j,z_j)$. The origin for the vertical z axis is taken to be sea surface. Then the distance between the $j^{th}$ source and the $i^{th}$ near-field hydrophone is $r_{ij}$ and the distance between the $j^{th}$ ghost source and the $i^{th}$ near-field hydrophone is taken to be $\rho_{ij}$.

$$r_{ij} = \sqrt{(x_i-x_j)^2+(y_i-y_j)^2+(z_i-z_j)^2}$$

$$\rho_{ij} = \sqrt{(x_i-x_j)^2+(y_i-y_j)^2+(z_i-z_j)^2} \qquad (1)$$

Using the method of images, the near-field hydrophone pressure is straightforward to compute at receiver $d_i$. The velocity of sound in water is denoted by c. The sea surface reflectivity is taken to be $R_s(\omega,\beta,h)$ and is negative one at zero frequency.

$$d_i(\omega) = \sum_{j=1}^{N} g_j(\omega) \left\{ \frac{e^{i\omega r_{ij}/c}}{r_{ij}} + R_s(\omega, \beta, h)\frac{e^{i\omega \rho_{ij}/c}}{\rho_{ij}} \right\} \qquad (2)$$

A common model for the sea surface reflectivity as a function of the sea state h (which is specified in meters), the angular frequency $\omega$, and the cosine of the reflection angle relative to the sea surface $\beta$ is given below (Equation 3). A variation on this model for sea surface reflectivity includes an additional scale factor denoted by gamma with a value slightly less than one (such as a value of gamma equal to 0.995). The locations of each ghost source relative to each near-field hydrophone receiver are known, so the cosine of the angle of the sea surface reflection for each source ghost term can be computed. Ziolkowski did not consider dependencies on the sea state, the angular frequency, or the cosine of the sea surface reflection angle for the sea surface reflectivity. He simply used a number close to minus one.

$$R_s(\omega, \beta, h) = -\gamma e^{-2\left(\frac{h\beta\omega}{2.83c}\right)^2} \qquad (3)$$

$$\gamma = 1$$

Firing an air gun generates an air bubble that rises in the water with velocity $v_{bubble}$ over time to reach sea surface. The bubble velocity is close to vertical and is dependent upon the size of the air gun's high pressure chamber with bubbles generated by large chamber volumes rising faster than bubbles generated by smaller chamber volumes. Consequently the equation below has a subscript j on the $v_{bubble}$ parameter. A near-field hydrophone moves with the velocity of the tow vessel or $v_{boat}$ over time in the x direction. Therefore if $x_i$ and $z_j$ are redefined to be the x location of the near-field hydrophone at zero time and the vertical location of the source at zero time respectively, these distance terms have the following temporal dependencies.

$$r_{ij}(t) = \sqrt{(x_i + v_{boat}t - x_j)^2 + (y_i - y_j)^2 + (z_i - z_j + (v_{bubble})_j t)^2} \qquad (4)$$

$$\rho_{ij}(t) = \sqrt{(x_i + v_{boat}t - x_j)^2 + (y_i - y_j)^2 + (z_i + z_j - (v_{bubble})_j t)^2}$$

Given the temporal dependencies of the distance terms between the sources and receivers, perhaps it is better to write out the response as a convolution in the time domain using the delta function notation.

$$d_i(t) = \sum_{j=1}^{N} g_j(t) * \left\{ \frac{\delta(t - r_{ij}(t)/c)}{r_{ij}(t)} + R_s(t, \beta, h) * \frac{\delta(t - \rho_{ij}(t)/c)}{\rho_{ij}(t)} \right\} \qquad (5)$$

Traditionally, marine acoustic sources are measured in units of bar-meters. A bar-meter is defined to be the number of bars of pressure that is measured by a pressure sensor located one meter away from a source. The choice of a reference distance, $r_{ref}$, to be one meter is arbitrary. The monopole acoustic Green's function suggests an amplitude of one and the associated time delay of 1 meter divided by the velocity of water for a reference receiver located one meter away from a notional source.

$$g'(t) = \frac{g\left(t - \frac{r_{ref}}{c}\right)}{r_{ref}} \qquad (6)$$

If the notional source g(t) at the true source location is redefined in terms of g'(t), the pressure recorded a reference distance away from the true source location, then the equation above must be modified as follows.

$$g(t) = g'\left(t + \frac{r_{ref}}{c}\right)(r_{ref}) \quad (7)$$

Then the notional source g'(t) and the recorded hydrophone data d(t) have the same units of pressure. Ziolkowski's formulation has been modified so that the reference distance for each air gun can vary. This flexibility is needed to match the geometry variations observed in marine seismic acquisition geometries.

$$d_i(t) = \sum_{j=1}^{N} g'_j \left\{ t + \frac{(r_{ref})_j}{c} \right\} (r_{ref})_j * \left\{ \frac{\delta(t - r_{ij}(t)/c)}{r_{ij}(t)} + R_s(t, \beta, h) * \frac{\delta(t - \rho_{ij}(t)/c)}{\rho_{ij}(t)} \right\} \quad (8)$$

Therefore, the Ziolkowski-style inversion problem of interest is to estimate the notional sources g'(t) given the near-field hydrophone pressure data d(t) and all of the pertinent geometry information for the acquisition configuration. Ziolkowski simplifies this problem to a Gauss-Seidel style solution method by taking $R_s$ to be a constant and by assuming that the only near-field hydrophone receiver locations available are one meter away from each source location. Then, the following recursion formula can be iterated to get a solution.

$$g'_i(t) = \frac{d_i(t)}{(r_{ref})_i} - \sum_{\substack{j=1 \\ j \neq i}}^{N} g'_j(t) \frac{(r_{ref})_j}{(r_{ref})_i} * \left\{ \frac{\delta(t - r_{ij}(t)/c + (r_{ref})_j/c)}{r_{ij}(t)} + R_s \frac{\delta(t - \rho_{ij}(t)/c + (r_{ref})_j/c)}{\rho_{ij}(t)} \right\} \quad (9)$$

The initial value for each $g'_i(t)$ can be set to the original near-field hydrophone data $d_i(t)$ to start the recursion.

This seemingly simple formula typically converges quickly, but not necessarily to a desired solution because of the inaccurate geometry information. In the near-field of the source array, 0.5 m error could lead to a large residual behind the primary peak. It has been found that including a damping term λ term (0.5<λ<1) in the recursion formula sometimes helps to mitigate errors due to inaccurate geometry information.

$$g'_i(t) = \frac{d_i(t)}{(r_{ref})_i} - \lambda \sum_{\substack{j=1 \\ j \neq i}}^{N} g'_j(t) \frac{(r_{ref})_j}{(r_{ref})_i} * \left\{ \frac{\delta(t - r_{ij}(t)/c + r_{ref}/c)}{r_{ij}(t)} + R_s \frac{\delta(t - \rho_{ij}(t)/c + r_{ref}/c)}{\rho_{ij}(t)} \right\} \quad (10)$$

In any case, new acquisition geometry designs may include more near-field hydrophone receivers than sources for each air gun array and therefore the present technological advancement can use an inversion algorithm that is different from Ziolkowski to account for the additional information available and to enable inversion for the desired geometry corrections. The notional source separation can be implemented either in the frequency or in the time domain. In the time domain, the implementation of time-dependent distances is straightforward, but it requires intensive time interpolation and can be more computationally expensive. In the frequency domain, on the other hand, the implementation of time-dependent distances is not straightforward, but the solution is purely linear algebra with zero bubble and vessel velocities, and is easy to solve. Therefore, the composite workflow is to first compute notional source separation in the frequency domain and then refine the solution via computations using more parameters in the time domain. First we can compute the initial notional source separation in the frequency domain by setting bubble velocity and vessel velocity to zero. Then the notional sources can be used as the initial guesses for the time-domain approach with non-zero bubble velocity and vessel velocity.

Additionally, available sea-state information is honored, and near-field hydrophone information from both the active and passive air gun arrays is included in the inversions. Streamer data can also be incorporated in the inversion if the instrument and hydrophone response differences for each receiver are understood and the instrumentation response of the near-field hydrophones and the streamer hydrophones can be made common.

Updating Source Array Geometry

A better solution to the geometry issue is straightforward: updating the geometry information during notional source separation. Niang et al. (2013) and Ni et al. (2014) proposed to use the passive near-field hydrophone array for the geometry information update by using an undisclosed optimization method.

The travel time information in seismic data is directly linked to the geometric information, which is the idea behind seismic tomography. Each near-field hydrophone receiver records the energy emitted from all the active air guns for a single shot. For a near-field hydrophone picking the arrival times from individual active air gun sources is impossible except for the air gun that is typically one meter below an active NFH. But each string of active air guns will result in a peak in each near-field hydrophone record, which is easy to pick. By minimizing the picked peak time and modeled peak time, the geometric information can be updated. An assumption could be made to further simplify the problem: air guns only deviate in the cross-string direction from their nominal locations. This assumption is mostly true because of the mechanical configuration of the air gun array fixes the distance between air guns in the in-string direction. The angles and distances between air gun strings commonly vary as the seismic acquisition vessel moves through the water.

One complicating factor that may occur in some geologic settings is gas bubbles seeping into the water or near-surface fresh water channels. When that happens, the water velocity is greatly reduced and travel times are lengthened due to the changes in water velocity. More often, any larger or smaller travel times between the active and passive gun arrays are due to changes in the separation distance rather than changes in water velocity. Changes in the water velocity are typically monitored by placing velocimeters in the streamer cables or in the air gun source arrays. This measured velocity information can be used to identify traveltime variations that are due to changes in the velocity of sound in water.

A second complication is the true firing times of air guns can vary from shot-to-shot. This is especially true for large volume air guns which can typically vary as much as and sometimes more than ±1 ms from the aiming point. The method described inherently takes this variability into account and can utilize firing time information provided by the air gun controller. Just as the method accommodates unplanned air gun timing errors, it can also accommodate intentional firing time delays used when multiple sources are fired in a programmed sequence for simultaneous marine source acquisition.

All of the near-field hydrophones should be used during the geometry updating including both the active and passive air gun arrays, in order to take full advantage of the information contained in the data. Incorporating additional near-field hydrophone receivers between air gun array positions and/or between the air gun strings can also help constrain an inversion for both notional sources and air gun array positioning. Moreover, the geometry updating could be automatic if the real geometry does not deviate too much from the nominal geometry. In this case, a windowed cross-correlation between real data and modeled data could be used to extract the travel time differences for each peak generated by each string of air guns, which are then minimized to update the source array geometry.

Figure 3:
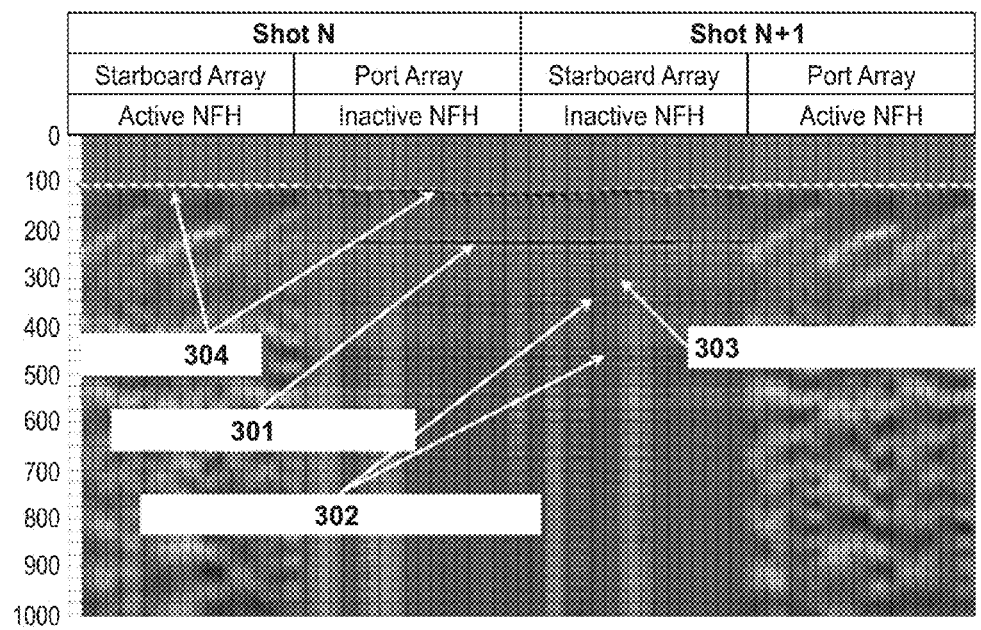
FIG. 3 is an exemplary trace display with a variable density underlay of the near-field hydrophone data associated with two successive shots using a flip-flop mode.
Figure 4:
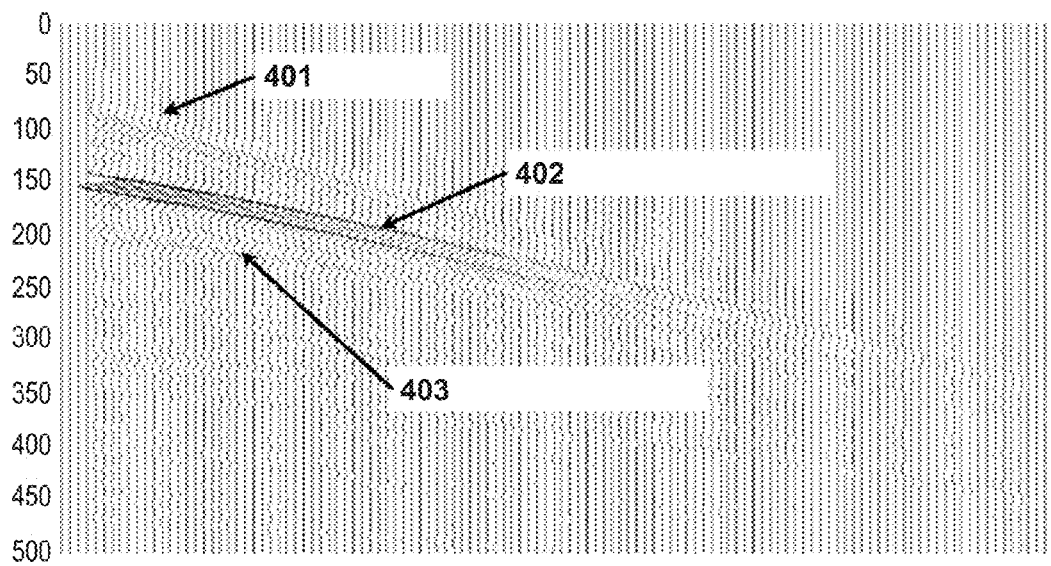
FIG. 4 is an exemplary common shot gather of the streamer hydrophone traces that are nearest to the source array.
Figure 5:
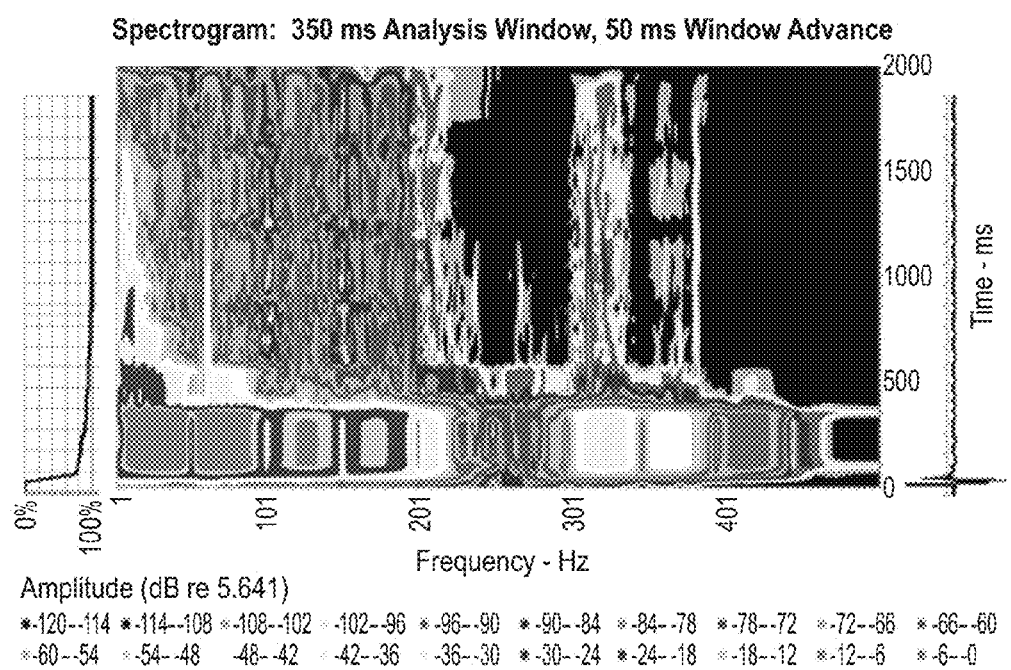
FIG. 5 is an exemplary time-variant analysis of an air gun far-field signature.
Figure 6:
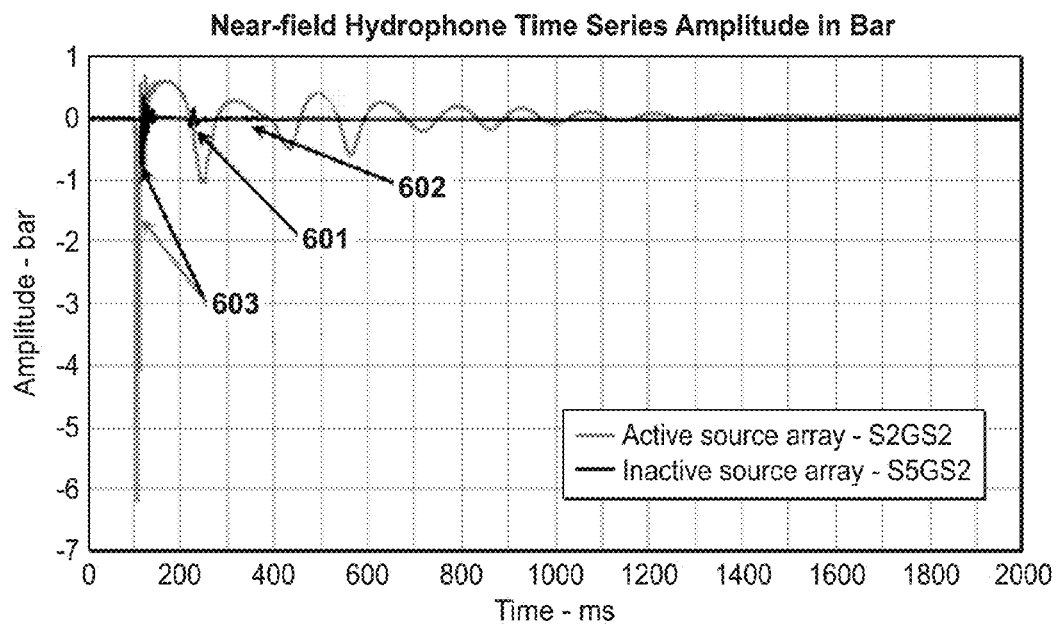
FIG. 6 is an exemplary common shot, trace display of the near-field hydrophone.
Figure 7:
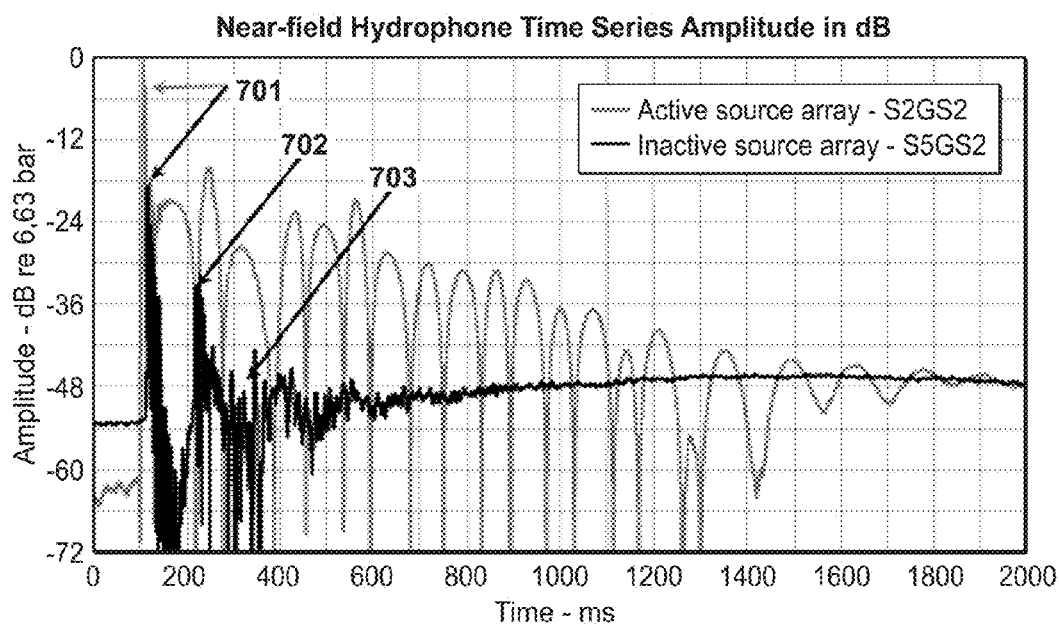
FIG. 7 is an exemplary common shot, trace display of the near-field hydrophone.

Remove Reflection Data from Active-Near Field Hydrophone Data in Shallow Water Environment In ultra-shallow water environments, i.e. water depths less than 50 m, shallow reflections are of appreciable amplitude compared to the direct wave, see FIG. 3, and cannot be neglected during notional source separation and subsequent far-field source wavelet modeling. Therefore, a pre-processing step can be used to incorporate the shallow reflection data (mainly seafloor reflection and its multiples) into the notional source separation process by adding extra terms to the equation (1.8). Hopperstad et al. (2006) proposed to include seafloor reflection in the equation (1), in order to eliminate the reflection data. Alternately the pre-processing step could remove the shallow reflection data from the active near-field hydrophone data. Ni et al. (2015) proposed a so-called "de-blending method" to separate the reflection data from the direct wave, using careful spectrum filtering. Kragh et al. (2000) proposed the use of beam-forming to generate reflection data and subtract it from near-field hydrophone record. This approach might not work well in an ultra-shallow water case because of the strong overlapping of direct wave and reflections. Kragh U.S. Pat. No. 8,958, 266 proposed to mute the direct arrivals which in moderate to shallow water depths would remove the shallow reflectors which act as multiple generators. Removing the multiple generator reflections would significantly complicate multiple attenuation for the seismic data volume.

In the pre-processing step, processed passive near-field hydrophone data are used as templates to be adaptively subtracted from active near-field hydrophone data. Adaptive subtraction is used to remove the predicted energy from the recorded seismic data. The predicted data are used as a "template" and are filtered and the filtered result is subtracted from the recorded data. The design of the filter for adaptive subtraction is typically done by minimizing the sum of the square of the residuals (the L2 norm) or by minimizing the sum of the absolute value of the residuals (the L1 norm) but can also be done by other filter designs. The act of filtering enables small adjustments to be made for variations in the amplitude and phase of the predicted direct arrival versus the recorded direct arrival. The use of adaptive subtraction adds robustness to the process but direct subtraction can be used if all acquisition parameters are fully calibrated and compensated properly with great accuracy. The predicted energy or template for the reflectivity estimate in this step comes from the "processed passive array near field hydrophone data" with the direct arrival information removed. In a prior step, the predicted energy or template for the direct arrival estimate comes from the notional source inversion from the active array near field hydrophone data plus a modeling step using equation 8. Then the direct arrival estimate is removed from the passive array near field hydrophone data by adaptive subtraction. Here, "processed passive near-field hydrophone data" means the direct wave has been removed (at least partially) from passive near-field hydrophone data. Reflection events are distinct on passive near-field hydrophone data. Simply muting the direct wave can remove the early peaks of direct wave from the passive near-field hydrophone data but doing so leaves residuals that are mostly low frequency bubble energy which is mixed with reflections. Given the fact that the low frequency end of passive near-field hydrophone data can be modeled fairly well using separated notional sources, we propose to first subtract the modeled direct wave from passive near-field hydrophone data and then mute the early residual that appears at the early part of the direct wave. Therefore, we can obtain clean reflection data, which has a little move-out compared to the reflection on active near-field hydrophone data. Then adaptive subtraction will accommodate the little move-out and output a relatively clean direct wave from active near-field hydrophone data. A workflow using this approach is discussed in the next section. This approach differs from the approach by Ni et al. (2015), because Ni et al first subtract data with average signature (requiring bathymetry variations) and then subtract further the high-pass filtered data, which might remove high frequency information from direct wave.

Alternatively, if the seafloor reflected wave and its multiples are the only strong reflection events that complicate the notional source separation, they can be included in the notional source separation process. For example, if the primary seafloor reflection is included in equation (1.8), we arrive at the following equation:

$$d_i(t) = \sum_{j=1}^{N} g'_j\left(t + \frac{(r_{ref})_j}{c}\right)(r_{ref})_j * \begin{cases} \frac{\delta(t - r_{ij}(t)/c)}{r_{ij}(t)} + R_s * \frac{\delta(t - \rho_{ij}(t)/c)}{\rho_{ij}(t)} + \\ R_f \frac{\delta(t - (r_{ij}(t))_{f1}/c)}{(r_{ij}(t))_{f1}} + R_f R_s \frac{\delta(t - (r_{ij}(t))_{f2}/c)}{(r_{ij}(t))_{f2}} + \\ R_f R_s \frac{\delta(t - (r_{ij}(t))_{f3}/c)}{(r_{ij}(t))_{f3}} + R_f R_s^2 \frac{\delta(t - (r_{ij}(t))_{f4}/c)}{(r_{ij}(t))_{f4}} + \end{cases} \tag{11}$$

where $R_f$ is seafloor reflectivity and the subscripts f1, f2, f3 and f4 on the (rij) terms denote the travel distances for primary seafloor reflection and its three ghosts. Higher-order multiples of seafloor reflection could be added to equation 11 depending on their amplitude.

A seafloor reflectivity coefficient and an accurate seafloor depth could be derived beforehand, which would benefit shallow-water de-multiple processing aiming at the water-layer peg-legs. First, run a notional source separation and then model the seafloor reflected waves with a trial seafloor reflectivity and a seafloor depth. Any misfit between the arrival time and amplitude can then be minimized by comparing the modeled and real data, which provide good estimations of seafloor reflectivity and seafloor depth.

Processing Workflow to Generate Zero-Offset and Nearly Zero-Offset Traces

Active near-field hydrophone array data are dominated by the active air guns located approximately 1 m below the near-field hydrophone. The most distinct arrivals are the primary pulse and bubble pulses. Reflected wave amplitudes are very small compared to the direct wave amplitudes on active near-field hydrophone array data, so small errors in processing to mitigate the direct arrivals might introduce large errors in the resulting estimates for active array reflectivity information. Reflection data are comparatively larger relative to the direct arrivals on passive near-field hydrophone array data, so reflectivity estimates from the passive near-field hydrophone data are less sensitive to small errors in mitigating the direct arrivals. Therefore, we propose the workflow in FIG. 8 where direct-arrival estimates are dominantly taken from active array near-field hydrophone data and reflectivity estimates are dominantly estimated using the passive near-field hydrophone array data after mitigation for the direct arrival energy. Then the reflectivity estimates are adaptively subtracted from the active near-field hydrophone array data and the process is iterated. For the present technological advancement, regardless of the step, direct subtraction is an option instead of adaptive subtraction if every aspect of the acquisition system has been fully calibrated and compensated with appropriate filters. Adaptive subtraction adds robustness to the process. The goal is to get both direct arrival and reflectivity estimates from both active and passive near-field hydrophone data using information from the combination of both types of data.

In step 801, for the first iteration, the active NFH data is used (direct arrivals at the active NFH are not available for the first iteration). In step 802, from the active near-field hydrophone data, an expanded notional source separation is run and step 803 models the direct wave on the passive near-field hydrophone array.

In step 804, the passive NFH data is obtained and in step 805, adaptive subtraction is used to subtract the modeled direct wave from the data on passive near-field hydrophone array and mute the early residual of the direct wave. The output from this step 805 is ideally reflection data on the passive near-field hydrophone array 806.

In step 807, the reflection data on the passive near-field hydrophone array is stacked on a string-by-string basis or on a combination of strings basis, and results in nearly zero-offset traces.

In step 808, NMO is applied to nearly zero-offset traces and adaptively subtract (or simply subtract) the traces from the real data on active near-field hydrophone array. The output from this step is ideally the direct wave on the active near-field hydrophone array. Potentially, the process can return to step 801 for another iteration.

In step 809, the direct wave on the active near-field hydrophone array is modeled, and in step 811 the modeled direct wave is subtracted from the real data obtained in step 810. The output from step 811 is ideally the zero-offset reflection data 812. However, the processing residuals on the active near-field hydrophones may be large enough to overshadow deeper target reflection data.

The modeled direct wave is also used to update the geometry in step 815, which is used in other iterations of the process. Step 815 updates estimates for near-field hydrophone geometry variations between the active and passive near-field hydrophone arrays by analyzing the relative distance between active and passive near-field hydrophone arrays compared to the timing differences measured on the direct arrivals seen on the passive near-field hydrophone data.

In step 813, the cross-correlation between the outputs from step 812 and step 807 is calculated, and then step 814 includes performing optimized stacking based on the cross-correlation coefficient, and outputting the zero-offset trace.

In the steps above, adaptive subtraction is a minimization processing technique that tries to minimize an objective function (L2 or L1 norm misfit, or other form) through designing a filter that links the two datasets being subtracted. Optimized stacking means stacking a suite of datasets based on a template. In this case, the template is the stacked reflectivity estimate taken from the passive array near field hydrophone data after mitigation to remove the direct arrival energy. In this case, the template is the stacked reflectivity estimate taken from the passive array near field hydrophone data after mitigation to remove the direct arrival energy. For this method a windowed cross-correlation function between the datasets and the template is used to compute the stacking weights, or coefficients. Then an optimized stacking is performed by the weighted summation based on the coefficients.

The method has been described in terms of a conventional, dual air gun, source array configuration shot in flip-flop fashion. The method as described is directly applicable to shooting arrangements that contain more than two source arrays. The method can be utilized for acquisition with a single source array by providing additional hydrophones located where the second source array in a dual source array configuration would be located.

Figure 12:
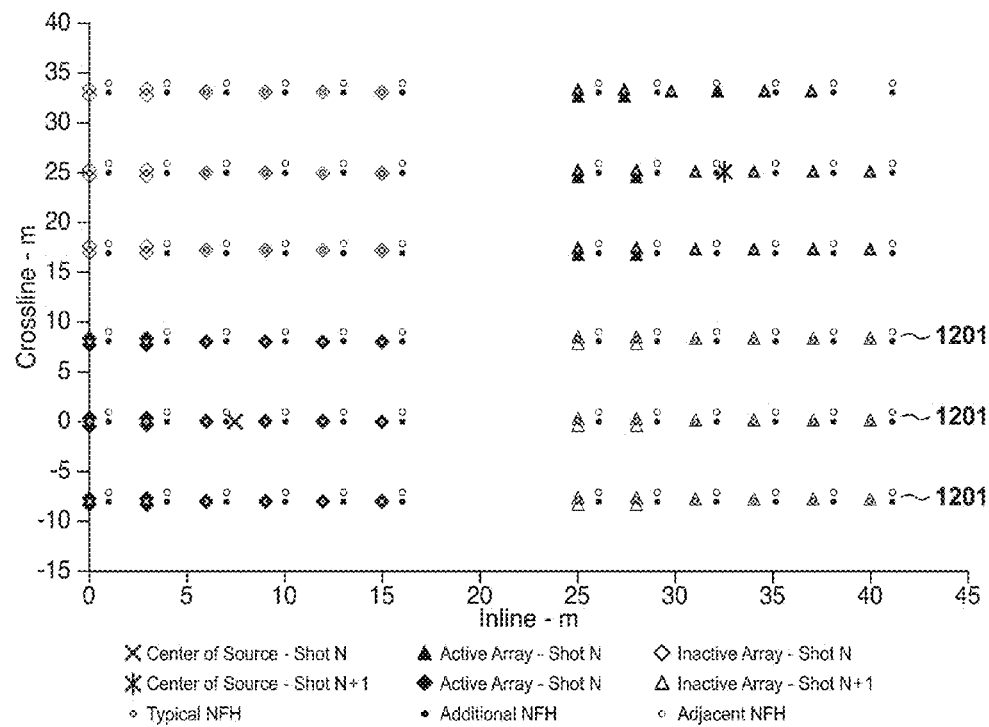
FIG. 12 is an exemplary plan view of two successive shots in a marine seismic survey.

The method inherently accommodates air gun array arrangements where the air guns are at a common depth or where the air guns are deployed at different depths. Equally, the method accommodates arrangements where the near-field hydrophones are at a common depth or where the near-field hydrophones are deployed at different depths. Adding significantly more near-field hydrophones than there are air guns, will improve the efficiency and accuracy of the notional signature estimates and will improve the signal-to-noise ratio of the derived zero-offset and near-zero offset traces. In this context, a significant increase in the number of near-field hydrophones would be a factor of two to four. Preferably additional near-field hydrophones would first be added between the existing gun stations in an air gun string, the black circles 1201 in FIG. 12, and then more additional near-field hydrophones can be added adjacent to the existing air gun stations but with a crossline extent, the open circles in FIG. 12. At these additional near-field hydrophone locations, the near-field hydrophone signal will still be dominated by the nearest active air gun which is an important consideration for estimating the notional signature for the air gun(s) at each gun station.

This workflow can provide: 1) an estimate of the notional signatures for the active source array on a shot by shot basis, 2) a substantially zero-offset trace, 3) a near-zero-offset trace at the crossline offset between the source arrays and 4) shot-by-shot estimates of the real time source array geometry. The initial arrival on the zero-offset and near-zero-offset traces can be used to estimate the water depth at each source location. The notional signatures and the updated source geometry allow shot-by-shot estimates of the far-field signature and the direct arrival at the streamer sensor sets to be computed. Since the notional signatures, the zero-offset trace and the near-zero-offset trace are computed on a shot-by-shot basis, shot-to-shot variations in the source array signatures automatically compensate for changes in the air gun configuration and the air gun array geometry.

Having shot-by-shot source compensated source signatures allows source signature stability estimates to be computed and incorporated into the quality control measures for a seismic sail line. An updated string geometry can be used as a data quality indicator for a sail line. Variability of the far-field signatures and the variability of the string geometry derived quality estimates can be used to rank the data quality for sail lines in a seismic survey. An example of a ranking would be to compute on a shot by shot basis the percent difference between the computed crossline spacing for the strings in the active source array and the nominal string spacing. At the end of a sail line, the number of shots with a percent difference greater than a given percentage, e.g. 10%, can be counted. The sail lines could be ranked for reshooting by the number of shots that exceeded the given percentage threshold. Alternately or additionally, the normalized crosscorrelation of the shot by shot far-field signature estimates with the presumed far-field signature could be computed. At the end of a sail line, a count of the number of crosscorrelation coefficients that fall below a given threshold can be computed and the sail lines ranked by this count. These two measures of shot to shot similarity could be combined in a weighted sum to create a composite sail line ranking. When strong multiples are present in a survey area, evaluation of field brute stacks to rank sail lines for their signal-to-noise ratio at the seismic imaging objective is hampered by the presence of high levels of multiple energy at the seismic imaging objective. A shot-by-shot type of quantitative source stability measure would be of particular value in shallow water environments where strong multiples are generated and for 4D seismic surveys where survey-to-survey repeatability is important.

The above discussion has used an array of air gun sources to explain the method. Ziolkowski's "notional" signature can be generalized to a notional source signature being the pressure field generated at a source station without interaction with any other source and without any source energy reflected from the ocean surface, the ocean bottom or the ocean subsurface. The method is equally applicable to marine source arrays of other marine source types whose signature consists of a large initial impulse followed by a coda such as Boomers and Bubble Guns. Bubble Gun is the trade name for a variable reluctance transducer which is typically used as a low power, marine seismic source. It is also applicable to marine source arrays which combine multiple types or marine sources such as a combined source array containing air guns and Bubble Guns. Unlike Newman, U.S. Pat. No. 4,693,336, describing that there be a significant delay between the firing of the different source types, the present technological advancement allows all sources within a composite source array to be fired contemporaneously or at arbitrary times within the shotpoint acquisition cycle.

Figure 9:
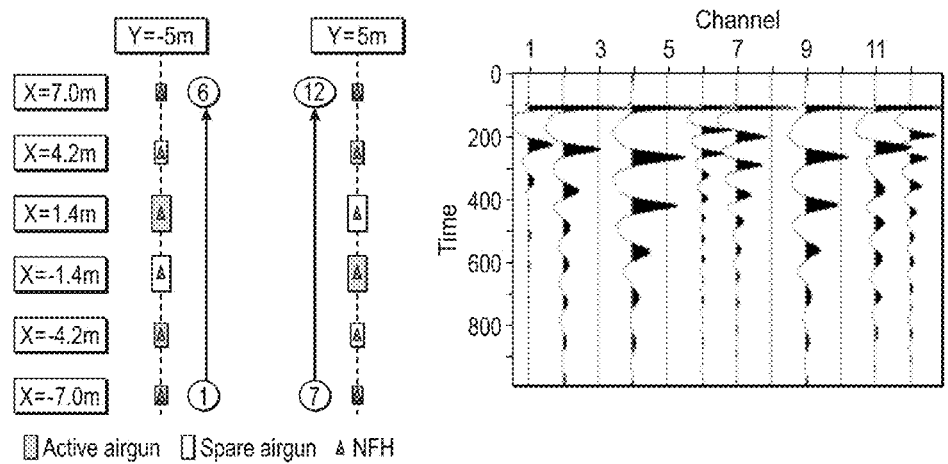
FIG. 9 illustrates synthetic near-field signatures for the air gun array.
Figure 10:
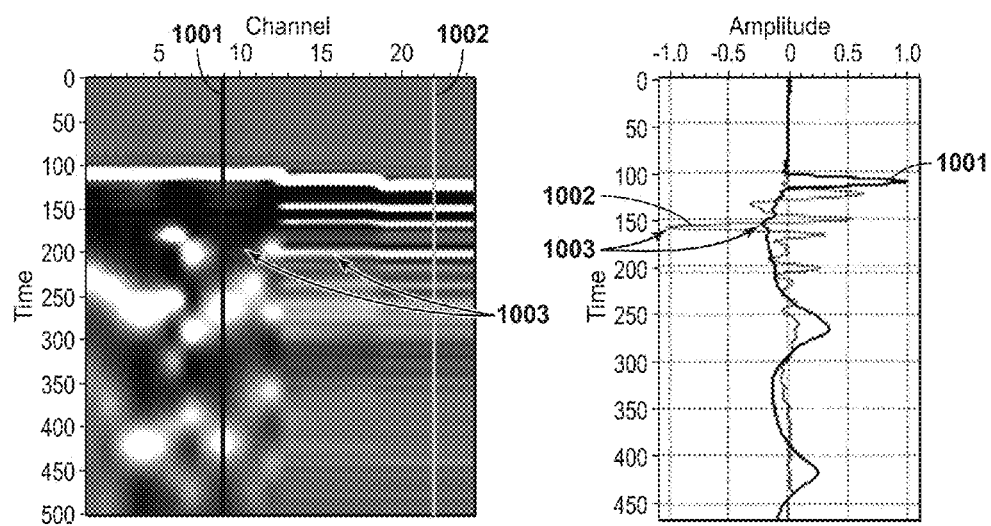
FIG. 10 illustrates synthetic common shot gather showing traces from the active and inactive source arrays.

The left-hand portion of FIG. 9 shows the arrangement of air guns and near-field hydrophones in a sample air gun source array. This arrangement was used to generate the near-field signatures shown in the right-hand side of FIG. 9. Common shots gathers using this air gun source were generated for a synthetic earth model where the water depth was set to 25 m. An example of the common shot gathers is shown in FIG. 10 along with a time series plot of a trace 1001 from the active source array and a trace 1002 from the inactive source array. The ocean bottom reflection 1003 has been noted. The amplitudes of these synthetic events agree with the amplitudes of the measured near-field hydrophone traces shown in FIG. 3.

Figure 11:
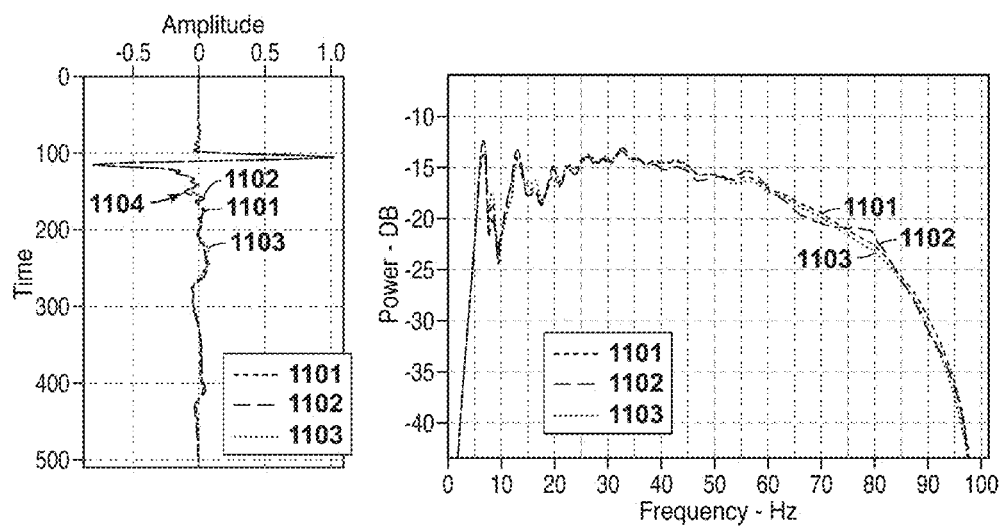
FIG. 11 illustrates exemplary far-field source signatures derived from the data shown in FIG. 10 and their power spectra.

One output of the method is a shot-by-shot estimate of the source array's far-field signature. FIG. 11 contains far-field signatures for the common shot gather shown in FIG. 10. One of the estimated far-field signatures was computed without separating reflection energy from the active near-field hydrophone data and the other was computed by using the described method to remove the ocean bottom and subsurface reflections. The far-field signature with the reflection energy removed closely resembles the true far-field signature. This can be seen by comparing the power spectra of the two signatures and by the removal of the ocean bottom reflection from the method's estimated far-field signature. 1101 is the true far-field source signature. 1102 is the derived far-field source signature without separating reflection from active near-field hydrophone data. 1103 is the derived far-field source signature following the present technological advancement. The water bottom reflection residual 1104 can be clearly seen in curves 1102.

Interpolation to Reconstruct the Missing Offset Data

According to the present technological advancement, the reconstructed missing near-offset streamer data generated through the interpolation method and the streamer data that was extrapolated are used to initialize an iterative estimation of primaries by sparse inversion (EPSI) algorithm or a closed-loop surface-related multiple estimation (CLSRME) method that estimates an update to the reconstructed missing near-offset streamer data and an update to predicted multiples.

With the zero-offset and nearly-zero-offset traces available, the next step is to shape the NFH traces to streamer data and interpolate between them to estimate the missing-offset data. The extra information provided by NFH data is confined to the source array locations spatially, typically with a scale less than 20 meters. For a typical 3D marine seismic survey, the scale of the cross-line span is over 400 meters, which makes the cross-line interpolation problematic using the NFH derived data. Therefore, we choose to interpolate primarily along the in-line direction between NFH data and inner streamer cables. Note that the nearly zero-offset traces are along the cross-line direction, rather than the in-line direction. An assumption is made here that the geology is not changing significantly in the scale of a seismic source array, which enables the use of derived nearly zero-offset traces to be used for in-line interpolation.

Before interpolation, a useful step is to process the zero-offset and nearly-zero-offset traces, in order to match their spectrum to the streamer data. Since NFH array and streamers pick up the same wave-field activated by the same source array, the differences between the recorded data are hence the receiver-side ghosting patterns due to different towed depths and instruments responses. Moreover, streamer records are typically from an array of hydrophones forming into groups, and hence the grouping response also needs to be addressed. Therefore, NFH processing steps need to include de-ghosting and spectrum shaping. Streamer data processing generally includes processing for direct wave removal, de-ghosting receivers and sources.

For NFH data, de-ghosting can be designed as a deterministic 1D receiver-side de-convolution process, for the trace number is small and the offset is quite rigid. If the instrument responses for NFH and streamer are known, then the difference between instrument responses could be removed by a de-convolution process and then a convolution process. However, this doesn't guarantee that the resulted amplitude is true as the NFH traces have undergone stacking processes. An extra constraint comes from the deep reflection data in both NFH traces and streamer data. The smallest missing offset for streamer data is about 100 meters, which might result in a large amplitude variation with offset (AVO) response difference for shallow reflected waves across the offset, but little AVO response difference for deep reflected waves. Therefore, the deep reflection events can be indicators for designing the spectrum shaping filter. By comparing the deep reflection events, the amplitude of zero- and nearly-zero-offset traces can be correctly constrained. For streamer data in ultra-shallow environment, the direct wave is mixed with reflections and hard to remove using conventional processing methods. With the notional sources derived as discussed above, we can model the direct waves at sensor sets locations in the streamers. Then an adaptive subtraction can be used to remove the direct wave from streamer data. Preservation of accurate AVO responses can be important as anomalous AVO responses are often associated with hydrocarbon accumulations in some geologic environments and therefore AVO may be used for hydrocarbon prospecting.

Processed zero- and nearly-zero-offset traces from NFH information can then be combined with streamer data to interpolate the missing-near-offset streamer data. Note that interpolation is much better constrained than extrapolation, especially with the right zero-offset and nearly-zero-offset wavelets and their amplitude. A high-resolution parabolic Radon transform is adopted to interpolate the missing near-offset data.

In practice, NFH hydrophones are designed to be more robust to survive in the high-energy environment close to source locations and thus are typically less sensitive, 7 V/bar versus 20 V/bar, than the hydrophones in the streamer cable. The streamer hydrophones can have increased sensitivity because the amplitudes of the direct arrivals from the air gun sources are significantly reduced in amplitude. Typically both streamer hydrophones and NFH are digitized using 24-bit sigma-delta digitizers which have a dynamic range on the order of 95 to 105 dB. The increased amplitude requirements placed on the NFH results in a poor signal-to-noise ratio (SNR) at later recording time (>2 s). On the other hand, the streamer hydrophones are more sensitive and have improved SNR at later recording times. In addition, at later recording times, streamer data extrapolated to near offset will not suffer from a lack of pre-critical reflection data or large normal move-out stretch and time shifts, and the streamer hydrophone data will be more accurate than the NFH due to the SNR of the streamer receivers. Therefore, it is recommended to combine the early interpolation result using both NFH traces and streamer data and the later extrapolation result just using streamer data. Two taper functions can be designed based on the knowledge of SNR. At the overlapping time of the two taper functions, the summation weights need to be unity.

The reconstructed near-offset data and steamer data are then injected into SWD or/and SRME for multiple prediction and elimination. Another possibility is to use EPSI or CLSRME type of methods to invert for the missing offset data, as well as multiples. These type of methods are more computational expensive, but they are feasible for 2D problems, as the interpolation is only along in-line direction (for inner cable). The interpolated traces using Radon methods can be a good candidate for a starting model that is expected to accelerate the convergence rate of EPSI or CLSRME. The zero-offset and nearly zero-offset data can be included into EPSI or CLSRME as regularization terms, which can guide the inversion to converge to optimized solution. Moreover, the far-field source signature derived from NFH data can be a very good initial source wavelet guess for EPSI and CLSRME, which will further accelerate the optimization process. Another possible solution to the interpolation problem is the joint use of Radon-domain interpolation and data-domain inversion methods (Baumstein and Neelamani 2010 and 2013).

Additional Features

Figure 8:
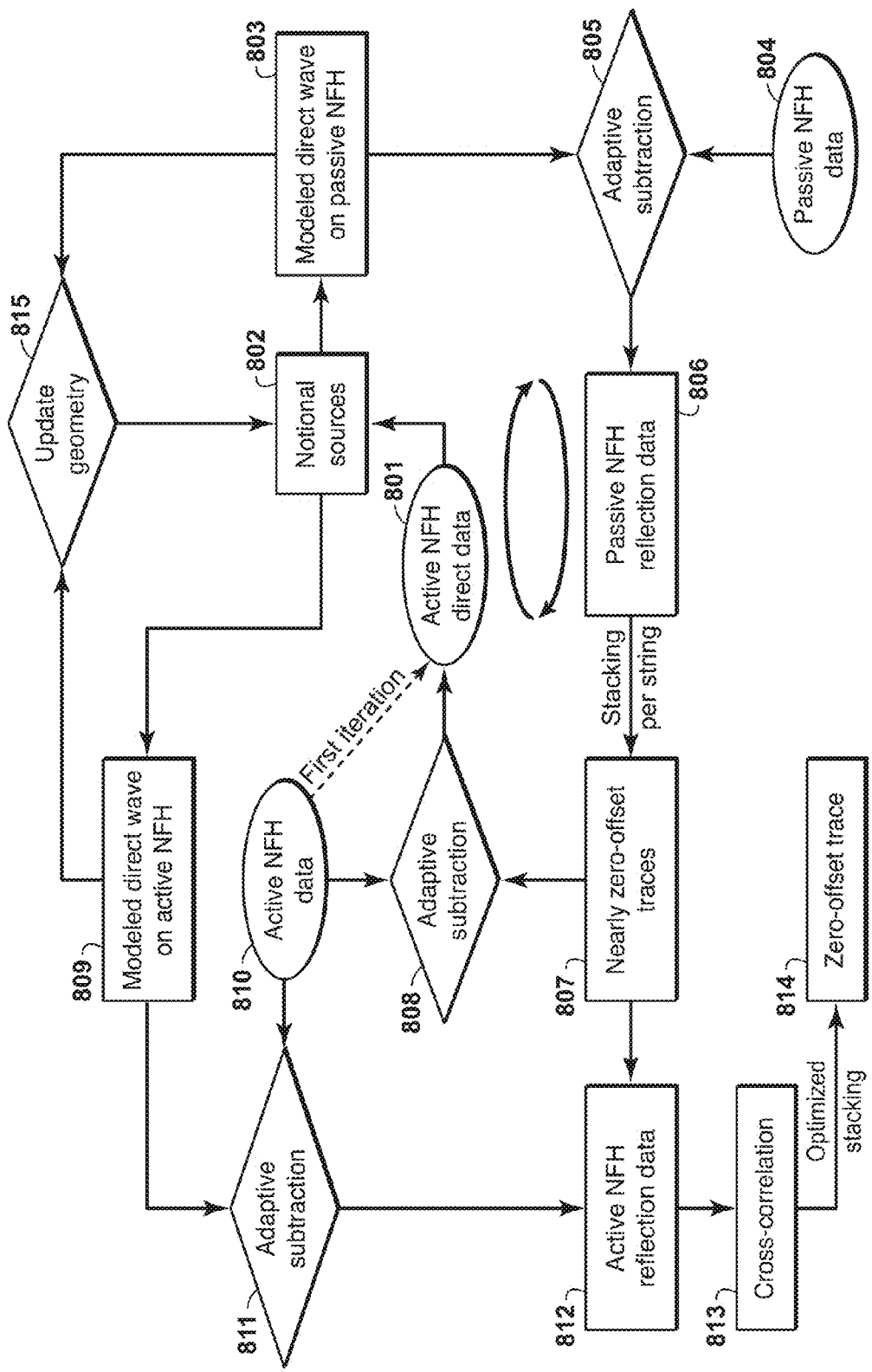
FIG. 8 is an exemplary method of implementing the present technological advancement.

Once the notional source inversion has been accomplished that includes the removal of any reflectivity information from the notional source estimate using the process shown in FIG. 8, Equation 8 can be used to simulate the direct arrival energy at the receiver locations for the marine streamer cable. An additional step of designing filters to compensate for the differences between the sensors and instrument responses in the near field hydrophone equipment relative to the marine streamer sensors, marine streamer sensor arrays, and marine streamer recording instrument equipment may be involved. The predicted direct arrivals at the marine steamer receivers are used as a template and adaptively subtracted from the marine streamer data. Direct arrival removal from the streamer data is accomplished by removing the instrumentation from the near-field hydrophone derived notional sources, these notional sources and their associated geometry are used to compute an estimate of the direct arrival at the streamer section. Then the instrumentation response and group spatial response of the streamer hydrophone group are convolved with the estimated direct arrival at the streamer group. The output of the convolutions is amplitude and/or phase matched then subtracted from the streamer hydrophone data.

According to the present technological advancement, the reconstructed near-offset streamer data from near-field hydrophone measurements and streamer measurements are used for the trace data estimate at small trace times and streamer data extrapolated to smaller offsets are used at longer trace times.

According to the present technological advancement, the reconstructed missing near-offset streamer data can be used in regularization terms to stabilize the method of Baumstein and Neelamani for doing near-zero offset data reconstruction.

According to the present technological advancement, the reconstructed missing near-offset streamer data can be provided as input to a shallow-water demultiple prediction method or a surface-related multiple prediction method.

The present technological advancement can also be used in the management of hydrocarbon. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Computer Implementation

Figure 13:
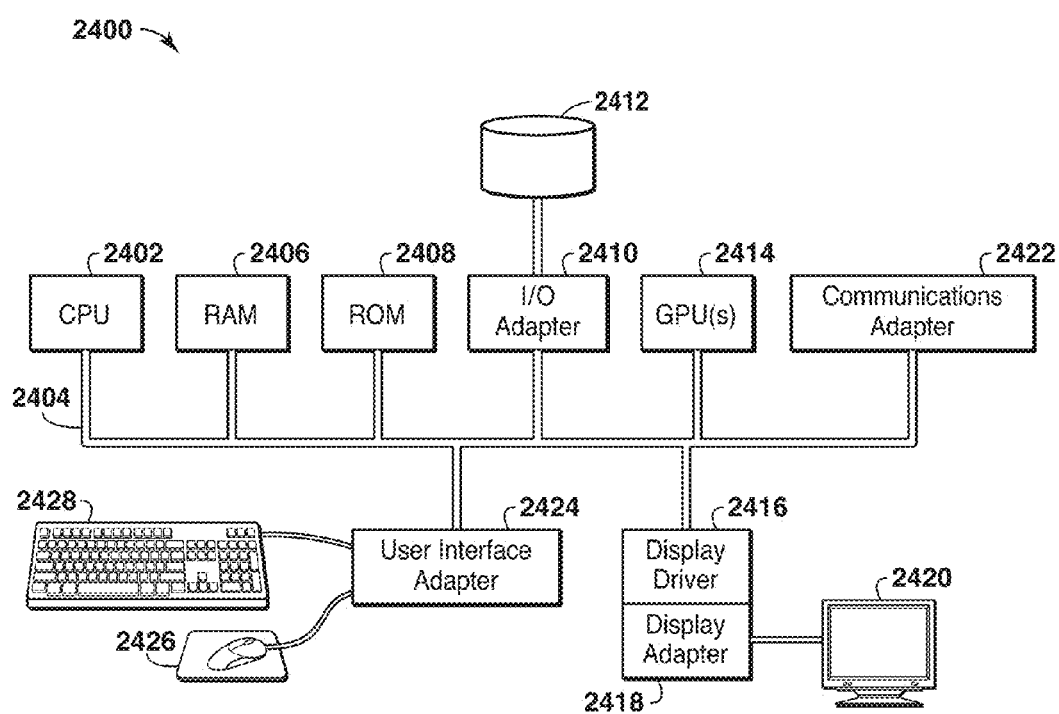
FIG. 13 is an exemplary computer system that can implement the present technological advancement.

FIG. 13 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 13, additional CPUs may be present. Moreover, the computer system 2400 may comprise a networked, multi-processor computer system that may include a hybrid parallel CPU/GPU 2414 system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display driver 2416 and the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The foregoing application is directed to particular embodiments of the present technological advancement for the purpose of illustrating the present technological advancement. It will be apparent, however, to one skilled in the art, that many modifications and variations to the embodiments described herein are possible. All such modifications and variations are intended to be within the scope of the present invention, as defined in the appended claims.

APPENDIX A

Iterative Notional Source Inversion Separating Direct Arrival and Reflectivity Information and Updating Source Array Geometry Information Using Both Active and Passive Array NFH Data.

Define the following as known input values. "A" denotes "active array" and "P" denotes "passive array".
(1) A="recorded NFH active array data".
(2) P="recorded NFH passive array data".

Define the following as unknown values to be computed. The number "0" denotes notional source. The number "1" denotes "direct arrival" and the number "2" denotes "reflection arrivals".
(3) A0="Estimate of ghost-free and reflectivity-free notional source inversion estimate for active array".
(4) A1="Estimate of NFH active array data with no reflectivity information" which corresponds to the "estimated direct arrival information only" at the active array near field hydrophones.
(5) A2="Estimate of NFH active array data with no direct arrival information" which corresponds to the "estimated reflectivity information only" at the active array near field hydrophones.
(6) P1="Estimate of NFH passive array data with no reflectivity information" which corresponds to the "estimated direct arrival information only" at the passive array near field hydrophones.
(7) P2="Estimate of NFH passive array data with no direct arrival information" which corresponds to the "estimated reflectivity information only" at the passive array near field hydrophones.

These unknowns are related to each other. For the final solution, the following will be true.

$$A = A1 + A2 \quad P = P1 + P2$$

Define convergence criteria for inversion iterations: Iterations converge and should be stopped when the norm of the change in the residual notional source estimate falls below a specified threshold value. Optional norms on the change in the residual to be compared to the threshold value could be (1) the sum of the squares of the residual (the L2 norm) or (2) the sum of the absolute values of the residuals (the L1 norm). The threshold value normally would be given as how many decibels of residual error are permissible for the inversion. Typically the signal-to-noise characteristics of the data suggest that 30 dB of residual error would be a reasonable level.

Initialize:
(1) A0=zero.
(2) A1=A.
(3) A2=zero.
(4) P1=zero.
(5) P2=B.

Also set these variables for the convergence test with reasonable parameters:
(6) Max iterations=10
(7) Threshold=30 dB Iterate the following steps:
(a) A0_old=A0
(b) A0=Notional source inversion of A1
   a. Optionally use equation 10 for doing the iterative notional source inversion
(c) Check for convergence
   a. If(((Norm(A0−A0_old)<threshold) and (iterations>1)) or (iterations>max iterations)) stop iterations (d) P1=Direct arrival simulation at passive array NFH locations via equation 8 using A0
   a. Pick timing errors between predicted direct arrivals on P1 and recorded values on P
      i. Update geometry information for the distance between the active arrays and the passive arrays
      ii. There may be benefit to smoothing the separation distances estimated between shots as we expect gun positions to change relative to each other but only slowly along a sail line.
   b. Re-compute P1 with updated geometry information via equation 8 using A0
(e) P2=Mute_above_water_bottom(P−adaptive_subtraction (P1))
(f) A2=A−adaptive_subtraction(Stack(NMO(P2)))
(g) A1=A−adaptive_subtraction(A2)
(h) Go to (a)

After convergence, do these steps.
(a) A0=Notional source inversion of A1
(b) A2=A−A1
(c) P1=P−P2

The output products at this point are A0, A1, A2 plus P1 and P2 plus the geometry information update.

Estimating Zero-Offset Reflectivity

Now, define the following additional reflectivity products that include source and receiver ghosts:
(1) C2="Estimate of effective zero-offset reflectivity from stack of normal moveout corrected reflectivity estimates P2 from the passive NFH arrays"
(2) D2="Optimal stacking estimate of effective zero-offset reflectivity from active NFH arrays"

Compute the following:
(a) C2=Stack(NMO(P2))
   a. Make a stack of NMO corrected passive array reflectivity estimates; and
   b. In the next step, use this stack as a reference to estimate optimal stacking weights
(b) D2=Optimally weighted sum(A2)
   a. Summation weights are proportional to the correlation of each A2 with C2; and
   b. Weights are normalized by the requirement that the sum of the weights is equal to one.

The final output products would be A0, A1, A2, P1, P2, D2 and the updated source string geometry information.

Marine Streamer Data

For the streamer data, define the following as known.
(1) S="recorded data on a marine streamer"

The following are unknowns that we would like to compute.
(2) S1="estimated direct arrival on a marine streamer"
(3) S2="estimated reflectivity information on a marine streamer"

Then, given A0 and information about any differences between recording systems, sensors, and sensor arrays for the marine streamer and the NFH data, S1 can be computed as a function of A0 and the source and receiver geometry information via a Green's function. Then S2 can be computed by either a direct subtraction or an adaptive subtraction. Often, the adaptive subtraction choice will be preferred.

$$S2=S-S1$$

So the pseudo code above was partly aimed at using the definitions for desired products (which are written out in English) for A0, A1, A2, P1, P2, D2, S1, S2, instead of words such as "zero offset" and "nearly zero offset" which are less clear. I think that the words "zero offset" and "nearly zero offset" are used by others in different ways and are confusing as a result. So the present technological advancement can generate A0 without contamination from reflectivity information, with A0 derived from inputs corresponding to both active and passive NFH data, where the active array NFH data have dominantly "direct arrival" information and the passive array NFH data have reflectivity information with good signal to noise ratio.

Given A0 and accurate geometry information, use of a Green's function enables the calculation of direct arrivals at any location including for the products A1, P1 and S1. Given the data, the reflectivity data can be estimated by either direct subtraction or adaptive subtraction of the estimated direct arrival. Adaptive subtraction is more accurate if there are small remaining errors in the geometry information or the wavelets on the data.

$$A2=A-A1$$

$$P2=P-P1$$

$$S2=S-S1$$

Then the present technological advancement can also generate D2.

REFERENCES

The following references are hereby incorporated by reference in their entirety:

Baumstein A. and R. Neelamani, 2010. Accurate data reconstruction through simultaneous application of statistical and physics-based constraints to multiple geophysical data sets. GEOPHYSICS, 75(6), WB165-WB172;

Baumstein, Anatoly and Remesh Neelamani, 2013, Method for analyzing multiple geophysical data sets, U.S. Pat. No. 8,352,190 B2.

Brac, 1986, Method and Device For Determining The Remote Emission Signature Of A Seismic Emission Assembly, U.S. Pat. No. 4,827,456;

Brink, M., Sabel, P., Eidsvig, S. and Kolbjorsen, K., 1999, The value of near field hydrophone measurements for monitoring source signature variations, EAGE 61st Conference Expanded Abstracts, session 6-09;

Dragoset, B., 2000, Introduction to air guns and air-gun arrays: The Leading Edge, 19, 892-897;

Hegna, S., 2008, Method for detecting air gun faults in a marine seismic source array, US PTO 20080175102;

Hegna, 2014, Estimation of Direct Arrival Signals Based On Predicted Direct Arrival Signals And Measurements, US20150234071;

Hoogeveen, 2006, System and Method For Determining Positions of Towed Marine Source-array Elements, U.S. Pat. No. 7,539,079;

Hopperstad, 2006, Methods and Systems For Determining Signatures For Arrays Of Marine Seismic Sources For Seismic Analysis, U.S. Pat. No. 7,440,357;

Hopperstad, J. F., and Laws, R., 2006, Source Signature Estimation-Attenuation of the Seafloor Reflection Error in Shallow Water: EAGE Expanded Abstract.

Hopperstad, 2009, Position Determination of A Seismic Source Array, U.S. Pat. No. 8,605,551;

Hopperstad, 2009, Position Determination of A Seismic Source Array, U.S. Pat. No. 8,687,462;

Laws, 2008, Using Source Elevation Measurements To Remove Sea Perturbations, US20090073804;

Laws, 2010, Determination of Notional Signatures, US20120072115;

Keers, 2008, Acquiring Near Zero Offset Survey Data, U.S. Pat. No. 8,467,264;

Keers, 2013, Acquiring Near-zero Offset Survey Data, US20130279291;

Kragh, E., R. Laws and A. Ozbek, 2000, Source Signature Estimation—Attenuation of the sea-bottom reflection error from near-field measurements: EAGE Expanded abstract;

Kragh, 2007, Zero-offset Seismic Trace Construction, U.S. Pat. No. 8,958,266;

Mott-Smith, 1973, Multiple Air Gun Array of Varied Sizes With Individual Secondary Oscillation Suppression, U.S. Pat. No. 3,893,539;

Newman, 1986, Underwater Seismic Testing, U.S. Pat. No. 4,693,336;

Ni, Y., T. Payen, and A. Vesin, 2014, Joint inversion of near-field and far-field hydrophone data for source signature estimation: SEG, Expanded Abstracts;

Ni. Y., F. Haouam and R. Siliqi, 2015, Source signature estimation in shallow water surveys: SEG Expanded abstract;

Niang, C., Ni, Y. and Svay, J, 2013, Monitoring of Air-Gun Source Signature Directivity: SEG Expanded Abstracts;

Norris, 2010, Zero Offset Profile From Near-field Hydrophones, U.S. Pat. No. 8,964,502;

Parkes, G. E., A. Ziolkowski, L. Hatton, and T. Haugland, 1984, The signature of an airgun array: computation from near-field measurements including interactions—Practical considerations: Geophysics, 49, 105-111;

Parkes, 2004, Method of Seismic Source Monitoring Using Modeled Source Signatures With Calibration Functions, U.S. Pat. No. 7,218,572;

Sheriff, R. E., Geldart, L. P. (1995). Exploration Seismology (2nd ed.), Cambridge University Press, p. 86. ISBN 0-521-46826-4.

Yang, 2008, Measuring Far Field Signature of A Seismic Source, U.S. Pat. No. 8,917,573;

Ziolkowski, 1981, Determination of Far Field Signatures, For Instance of Seismic Sources, U.S. Pat. No. 4,476,550;

Ziolkowski, A. and Johnston, R., 1997, Marine seismic sources: QC of wavefield computation from near-field pressure measurements, Geophysical Prospecting, 45, 611-639;

Ziolkowski, A., 1998, Measurement of air-gun bubble oscillations: Geophysics, 63, 2009-2024; and Ziolkowski, 1988, Method of Accumulation Data For Use In Determining The Signatures of Arrays of Marine Seismic Sources, U.S. Pat. No. 4,868,794.

What is claimed is:

1. A method for obtaining zero-offset and near zero offset seismic data from a marine survey, with separation of direct arrival information and reflectivity information, the method comprising:

modeling, with a computer, a direct arrival estimate at a passive near-field hydrophone array by using a notional source separation on active near-field hydrophone data;

generating, with a computer, reflection data for the passive near-field hydrophone array by subtraction of the modeled direct arrival estimate from data recorded by the passive near-field hydrophone array;

generating, with a computer, near zero-offset reflectivity traces by stacking the reflection data for the passive near-field hydrophone array on a string-by-string basis or on a combination of strings basis;

generating, with a computer, reflectivity information at an active near-field hydrophone array by subtracting the direct arrival estimate modeled using the notional source separation from the active near-field hydrophone data; and generating, with a computer, an estimate of zero-offset reflectivity traces by calculating a cross-correlation between the reflectivity information at the active near-field hydrophone array and the near zero-offset reflectivity traces and performing an optimized stacking with summation weights based on coefficients of the cross-correlation.

2. The method of claim 1, further comprising:

generating a reflectivity estimate at active near field hydrophone locations by applying normal moveout timing corrections to the near zero-offset reflectivity traces and stacking;

generating active array near field hydrophone data without reflectivity information by adaptively subtracting the reflectivity estimate at active array hydrophone locations;

generating a notional source update using as input the active array hydrophone data without reflectivity information;

generating a reflectivity information update at the active array hydrophone data locations by subtracting a direct arrival estimate modeled using the notional source update; and generating an updated estimate of zero-offset reflectivity traces by calculating a cross-correlation between the reflectivity information update at the active array hydrophone data locations and the near zero-offset reflectivity traces and performing an optimized stacking with summation weights based on coefficients of the cross-correlation.

3. The method of claim 1, wherein the generating the reflection data for the passive near-field hydrophone array includes muting an early residual of the direct arrival estimate prior to the water bottom reflection.

4. The method of claim 1, further comprising generating far-field estimates for the active and passive hydrophone arrays from notional source signatures generated from the notional source separation.

5. The method of claim 4, further comprising ranking data quality for sail lines in a seismic survey with variability of far-field signatures or string geometry variability.

6. The method of claim 1, further comprising updating estimates for near-field hydrophone geometry variations between the active and passive near-field hydrophone arrays by analyzing a relative distance between the active and passive near-field hydrophone arrays compared to timing differences measured on the direct arrivals in the data recorded by the passive near-field hydrophone array.

7. The method of claim 1, further comprising conducting a seismic survey, wherein additional near-field sensors are added to a source array in addition to near-field hydrophones disposed at each source station.

8. The method of claim 1, further comprising deriving notional signatures in the notional source separation by computing an initial source separation in a frequency domain and using frequency-domain-derived notional sources as initial guesses for a time-domain approach with non-zero bubble velocity and non-zero vessel velocity.

9. The method of claim 1, wherein a source array used in the marine survey includes at least two different marine sources.

10. The method of claim 1, further comprising:

obtaining an estimation of seafloor reflectivity and seafloor depth by computing the notional source separation and then modeling seafloor reflected waves with a trial seafloor reflectivity and a trail seafloor depth; and minimizing a misfit between arrival time and amplitude by comparing modeled and real data.

11. The method of claim 1, further comprising:
reconstructing missing near-offset streamer data with an interpolation method and the estimate of zero-offset reflectivity traces and the near zero-offset reflectivity traces.

12. The method of claim 11, wherein the reconstructed missing near-offset streamer data are used for trace data estimation at small trace times and streamer data extrapolated to smaller offsets are used at longer trace times.

13. The method of claim 12, wherein the reconstructed missing near-offset streamer data generated through the interpolation method and the streamer data that was extrapolated are used to initialize an iterative estimation of primaries by sparse inversion (EPSI) algorithm or a closed-loop surface-related multiple estimation (CLSRME) method that estimates an update to the reconstructed missing near-offset streamer data and an update to predicted multiples.

14. The method of claim 1, further comprising removing direct arrival energy from streamer data using one or more of the modeled direct arrival estimate on the passive near-field hydrophone array or the modeled direct arrival estimate on the active near-field hydrophone array.

15. A non-transitory computer readable storage medium, encoded with instructions, which when executed by a computer causes the computer to implement a method for obtaining zero-offset and near zero offset seismic data from a marine survey, with separation of direct arrival information and reflectivity information, the method comprising:
modeling a direct arrival estimate at a passive near-field hydrophone array by using a notional source separation on active near-field hydrophone data;
generating reflection data for the passive near-field hydrophone array by subtraction of the modeled direct arrival estimate from data recorded by the passive near-field hydrophone array;
generating near zero-offset reflectivity traces by stacking the reflection data for the passive near-field hydrophone array on a string-by-string basis or on a combination of strings basis;
generating reflectivity information at an active near-field hydrophone array by subtracting the direct arrival estimate modeled using the notional source separation from active near-field hydrophone data; and
generating an estimate of zero-offset reflectivity traces by calculating a cross-correlation between the reflectivity information at the active near-field hydrophone array and the near zero-offset reflectivity traces and performing an optimized stacking with summation weights based on coefficients of the cross-correlation.

* * * * *